United States Patent [19]

Bhaskar et al.

[11] Patent Number: 5,479,643
[45] Date of Patent: Dec. 26, 1995

[54] VIRTUAL MACHINE PROGRAMMING SYSTEM

[75] Inventors: Kasi S. Bhaskar, Seattle; James K. Peckol, Edmonds, both of Wash.

[73] Assignee: John Fluke Mfg. Co., Inc., Everett, Wash.

[21] Appl. No.: 750,772

[22] Filed: Aug. 22, 1991

Related U.S. Application Data

[60] Continuation of Ser. No. 238,145, Aug. 30, 1988, abandoned, which is a division of Ser. No. 798,931, Nov. 18, 1985, Pat. No. 4,849,880.

[51] Int. Cl.⁶ .................................................. G06F 15/00
[52] U.S. Cl. ................ 395/500; 364/264.3; 364/264.5; 364/221.2; 364/221.1; 364/DIG. 1; 364/146; 364/188; 395/155
[58] Field of Search ................................. 395/155–161; 364/146, 188

[56] References Cited

U.S. PATENT DOCUMENTS

| | | | |
|---|---|---|---|
| 4,064,394 | 12/1977 | Allen | 364/107 |
| 4,152,760 | 5/1979 | Freitas et al. | 364/900 |
| 4,245,318 | 1/1981 | Eckart et al. | 364/481 |
| 4,298,955 | 11/1981 | Munday et al. | 364/900 |
| 4,315,315 | 2/1982 | Kossiakoff | 364/300 |
| 4,455,619 | 6/1984 | Masui et al. | 364/900 |
| 4,497,033 | 1/1985 | Hernandez et al. | 364/900 |
| 4,499,549 | 2/1985 | Bartlett | 364/900 |
| 4,546,435 | 10/1985 | Herbert et al. | 364/308 |
| 4,586,035 | 4/1986 | Baker et al. | 340/712 |
| 4,628,444 | 12/1986 | Nozawa et al. | 364/900 |
| 4,635,183 | 1/1987 | Isobe et al. | 364/188 |
| 4,636,934 | 1/1987 | Schwendemann et al. | 364/132 |
| 4,642,790 | 2/1987 | Minshull et al. | 364/900 |
| 4,656,603 | 4/1987 | Dunn | 364/900 |
| 4,663,704 | 5/1987 | Jones et al. | 364/188 |
| 4,674,053 | 6/1987 | Bannai et al. | 364/146 |
| 4,677,587 | 6/1987 | Zemany, Jr. | 364/900 |
| 4,688,167 | 8/1987 | Agarwal | 364/200 |
| 4,695,968 | 9/1987 | Sullivan, II et al. | 364/578 |
| 4,736,340 | 4/1988 | Desserrieres et al. | 364/900 |
| 4,745,543 | 5/1988 | Michener et al. | 364/146 |
| 4,811,205 | 3/1989 | Normington et al. | 364/900 |
| 4,813,013 | 3/1989 | Dunn | 364/900 |
| 4,816,988 | 3/1989 | Yamanaka | 364/188 |
| 4,868,785 | 9/1989 | Jordan et al. | 364/900 |
| 4,914,568 | 4/1990 | Kodosky et al. | 364/200 |
| 4,967,381 | 10/1990 | Lane et al. | 364/146 |

*Primary Examiner*—Christopher B. Shin
*Attorney, Agent, or Firm*—John P. Dellett

[57] ABSTRACT

A system for programming a computer provides a set of software-based virtual machines each for instructing a computer to carry out a selected operation. Each virtual machine is represented by a virtual front panel displayed on a screen and each virtual front panel graphically displays operator controllable values of input and output parameters utilized by the virtual machine it represents. The system is adapted to synthesize a new virtual machine for instructing the computer to perform a sequence of operations wherein each operation is carried out by the computer according to the instructions of an operator selected one of the existing virtual machines. The system also creates a new virtual front panel for displaying input and output parameters associated with the new virtual machine. The system permits the operator to program the computer by directing synthesis of a hierarchy of virtual machines.

8 Claims, 8 Drawing Sheets

| Synthesizing Gainmeter | | | |
|---|---|---|---|
| atFreq<br>inLevel<br>measuredGain<br><br>90 | function<br>number<br><br>92 | | linearGraph<br>linearMeter<br>list<br>logGraph<br>logMeter<br>98 | ← 84

82 ↗

| | INPUT | OUTPUT | |
|---|---|---|---|
| | 94 | 96 | | runMe
|t|
"Gainmeter"
"1 October 1985"                              86
^self myValue: self myValue "replace me"

self atFreq
self inLevel                                  88
self measuredGain

FIG. 4

MeterController instance methods controlActivity
isControlActive
newValueSymbol
newValueSymbol:
menuMessageReceiver
RedButtonMenu: redButtonMessages:

FIG. 5A

MeterView class methods withScale:

MeterView instance methods

| initialize | display |
| itemName: | forceFullDisplayNextTime |
| maxValue | valueAccessSymbol: |
| maxValue: | valueChange |
| minValue | valueChangeSymbol: |
| minValue: | update: |
| scale | updateSymbol: |
| scale: | valueFromModel |

PanelMeterView instance methods initScale    displayView
             newValue:

BarGraphView instance methods displayView    initScale
newValue:

FIG. 5C

GENERATOR CLASS METHODS

| | | |
|---|---|---|
| addGenerator: | listGenerators | runSelectedInstrument |
| addGeneratorSpec: parameters: | selectedGenerator | selectedInstrument |
| compileGenerator: | selectedSynthesizer | showSelectedInstrument |
| initialCodeList: | synthesis | wakeInstruments: |
| initialize | wakeGenerators: | initCode |
| new: | example | initType |
| newInstance | addInstrument | initView |
| SelectedSynthesizer | addInstrument: | inspectInstance |
| addGenerator | deleteInstrument | inspectMe |
| codeList | displayInstruments | typeList |
| deleteGenerator | generateSelectedInstrument | typeMenu |
| displayGenerators | inspectInstrument | viewList |
| generatorMenu | instrumentList | wakeType: |
| inspectSelectedGenerator | instrumentMenu | wakeView: |
| | listInstruments | |

122 / ↓ / 120

GENERATOR INSTANCE METHODS

| | | |
|---|---|---|
| addParameter: | wakeParameter: | myOut |
| addParameterToList: | addCode: | myOut: |
| block: | clearCode | sB |
| getSelectedParameter | codeList | sC |
| initialize: | codeMenu | sP |
| makeParameterMessage: in: | compileMessage | sType |
| setName: | deleteCode | sType: |
| setParameter: blok: | editCode | sView |
| inspectMe | insertCode: | sView: |
| addParameter | inspectCode | bindList |
| deleteParameter | modifyCode | bindMenu |
| getParameters | resetCode | clearBindList |
| inspectParameter | wakeCode: | deleteBind |
| newInstance | displaySynthesis | getBindList |
| parameterList | instrumentName | inspectBindList |
| parameterMenu | myIn | selectedBinding |
| | myIn: | wakeBind: |

FIG. 6

VIRTUAL MACHINE PROGRAMMING SYSTEM

This is a continuation of application Ser. No. 07/238,145 filed Aug. 30, 1988, and now abandoned, which is a divisional application of Ser. No. 06/798,931 filed Nov. 18, 1985, now U.S. Pat. No. 4,849,880 issued Jul. 18, 1989.

BACKGROUND OF THE INVENTION

The present invention relates in general to programming of computer systems and more particularly to a method and apparatus for developing applications software.

The number of applications for computers has grown remarkably in the last few years and so too has the number of persons skilled in the art of computer programming. Nonetheless computer literacy is not universal and in any case the programming of any new system is usually time consuming. One category of a programmable system involves computer controlled combinations of test instruments adapted to provide a common result. Microcomputers have been incorporated into the design of many electronic test instruments such as multimeters, signal generators, logic analyzers, digitizers and the like wherein the microcomputers typically control instrument settings, data storage and display, and often provide communication with a host computer through interconnecting buses. The host computer may be programmed to supply instructions to the microprocessor in each instrument for controlling the operation of the individual instruments in performing selected tests, while also acquiring data from the instruments, performing calculations based on the acquired data, and displaying the results. Once computer software is developed for various tests to be performed the computer-based instrument system greatly reduces the labor required inasmuch as an operator does not then have to manually adjust the settings of the instruments before or during such test and does not have to manually assemble or process the data acquired. However, the major drawback to such computer-based instrument systems relates to the need for development of separate host computer software for each combination of tests. Testing is described by way of example and it is understood the problems associated with assembling of other combination systems may be similarly addressed. What is needed is a method and apparatus for permitting persons not skilled in the art of computer programming to easily develop easily used computer applications software.

SUMMARY OF THE INVENTION

According to one aspect of the present invention, a computer programming system provides a set of software-based "virtual machines" each for receiving input parameters and for producing output parameters related to the input data in a selected manner. Each virtual machine is suitably represented by a corresponding "virtual front panel" comprising a graphical display or other means for representing its input and output data. The system permits an operator to adjust the values of input parameters displayed by the virtual front panel, by manipulating a cursor or the like, and allows the operator to command the machine to "run" (i.e., to produce and display its output parameters based on the current input parameters) by selecting a command from a displayed menu or other input. The virtual machine front panel provides a graphical representation of underlying virtual machine software in a manner easily understood by an operator and facilitates communication between software and operator.

According to another aspect of the present invention, the operator can define a "synthesized virtual machine" for performing a selected sequence of operations, the operator defining each operation of the sequence by selecting a pre-existing virtual machine capable of performing such operation. The operator also names the input and output parameters of the virtual machine and specifies where the input parameters required by each operation of the sequence are to be obtained. The programming system of the present invention then generates and stores computer code necessary to implement the synthesized virtual machine, including an associated virtual front panel according to the operator's specification, thereby permitting an operator to create applications software without actually writing it. Once the software for a virtual machine has been synthesized, the operator may create instances and for each may adjust the input parameters of the synthesized virtual machine and command it to run in the same manner as any other virtual machine.

According to a further aspect of the invention, the operator may synthesize additional "higher order" virtual machines wherein one or more of a sequence of operations is carried out by previously synthesized virtual machines. In such fashion the operator may create a hierarchy of synthesized virtual machines, each higher order virtual machine employing lower order machines in performing its function. This aspect of the invention permits an operator to create highly complex applications software in a structured manner wherein each separate element of the software comprises a virtual machine which can be independently tested and modified, thereby simplifying the process of developing and debugging applications software.

According to still another aspect of the invention in a preferred embodiment thereof, a host computer is connected through a bus to a set of microcomputer-based instruments such as voltmeters, signal generators and the like, each adapted for performing a selected test or other function. Each instrument is represented by the host computer as a corresponding virtual "instrument" or machine including means to transmit input parameters to the corresponding instrument and to receive output parameters therefrom, the input and output parameters being displayed on a corresponding virtual front panel. Selected host computer operations such as addition, multiplication, and the like, are also carried out by representative virtual machines. Each virtual machine is available for selection by an operator when synthesizing a higher level virtual machine so that operation of any real instrument may form a step in a sequence of operations performed by the higher level virtual machine.

Accordingly, an operator may synthesize a virtual machine to control and coordinate the operations of one or more instruments accessed by the host computer, perform computations based on the data produced by such instruments, and display the results of the computations as outputs on a virtual front panel.

It is therefore an object of the invention to provide a new and improved method and apparatus for organizing computer operation.

It is another object of the invention to provide a new and improved method and apparatus for developing and structuring computer applications software.

It is a further object of the invention to provide a new and improved method and apparatus for programming a computer-based instrument system.

The subject matter of the present invention is particularly pointed out and distinctly claimed in the concluding portion of this specification. However, both the organization and method of operation of the present invention, together with further advantages and objects thereof, may best be understood by reference to the following description taken in connection with accompanying drawings wherein like reference characters refer to like elements.

DRAWINGS

Figure 3A:
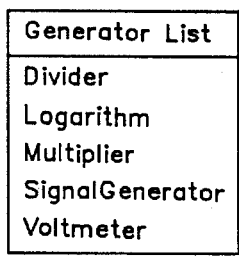
Figure 3B:
Figure 3C:
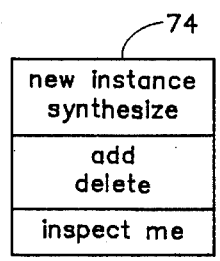
Figure 3D:
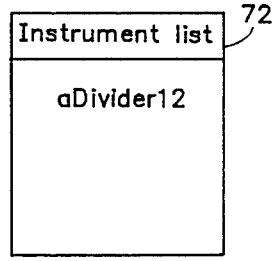
Figure 3E:
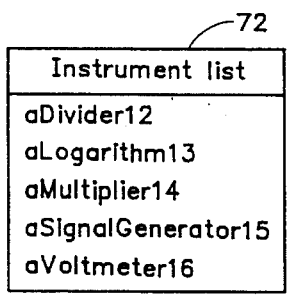
Figure 3F:
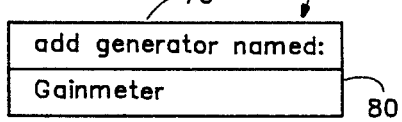
Figure 3G:
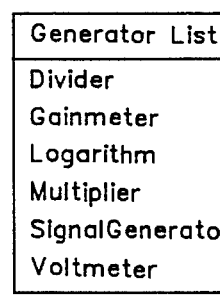
Figure 3H:
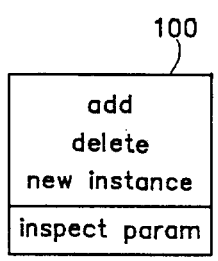
Figure 3I:
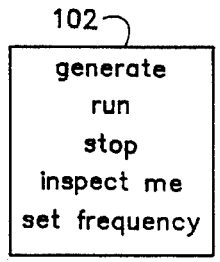
Figure 3J:
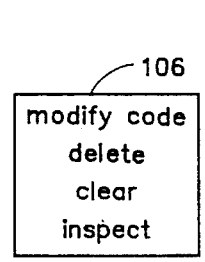
Figure 3K:
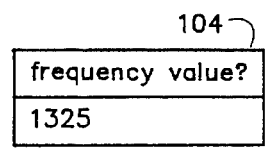
Figure 3L:
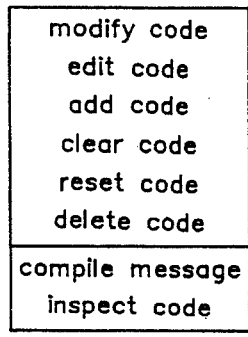
Figure 3M:
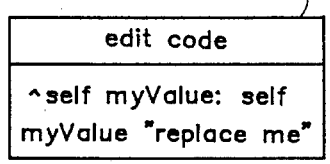
Figure 3N:
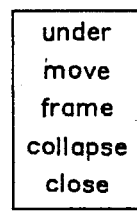
Figure 3P:
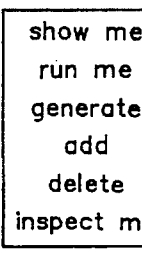

FIGS. 3A–3P comprise menus, lists and dialog box displays produced by the present invention;

FIG. 4 illustrates an example of a synthesizing window display according to the present invention; and FIGS. 5–8 are charts of code listings for implementing the present invention.

DETAILED DESCRIPTION

Figure 1:
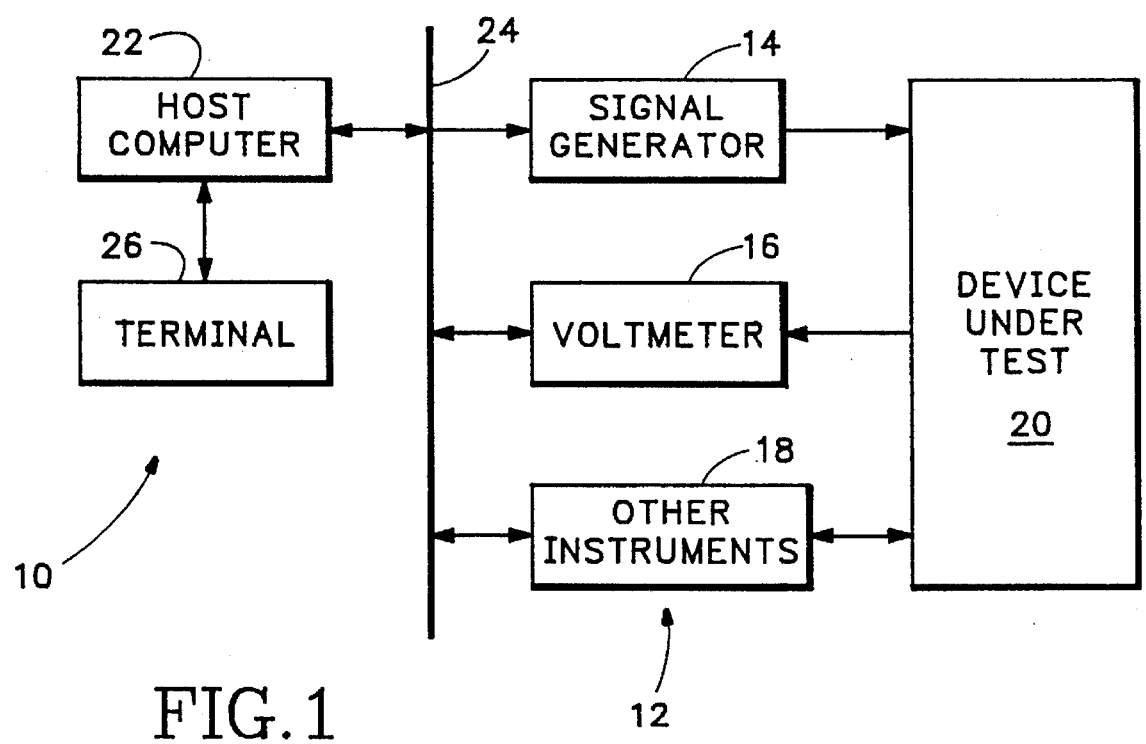
FIG. 1 is a block diagram of a computer-based instrument system for implementing the present invention.

Referring to FIG. 1, there is depicted in block diagram form a computer-based instrument system 10 adapted to control and coordinate the operations of a plurality of computer-based instruments 12 according to the present invention. Instruments 12 include, by way of example, a signal generator 14, a voltmeter 16, and such other instruments 18 as may be useful for testing a device under test 20. Each instrument 12 includes means for receiving signals and input data for controlling its operation from a host computer 22 transmitted over a means for communication such as a bus 24 and/or means to transmit acquired data back to the host computer 22 over means 24. The system 10 also includes a terminal 26 having a display screen and input devices including a keyboard and a mouse controller or similar device for controlling the position of a cursor on the screen. The mouse is provided with three buttons: a red button for selecting objects indicated by the cursor, a blue button for opening a menu for controlling the display of a selected display window on the screen, and a yellow button for opening menus for controlling the behavior of software associated with a selected window.

According to the present invention, the host computer 22 is adapted to communicate with each instrument 12 by means of a corresponding software-based virtual instrument (i.e., virtual machine) comprising a set of computer instructions for performing a selected function and which may be graphically represented in the form of a corresponding "virtual front panel" displayed on terminal 26. The virtual front panel associated with a virtual machine suitably displays the values of any input parameters used by the machine and any output parameters produced by the virtual machine.

A virtual instrument or machine may be adapted to transmit its input parameters to the corresponding real instrument and to acquire its output parameters from the real instrument through bus 24.

Figure 2A:
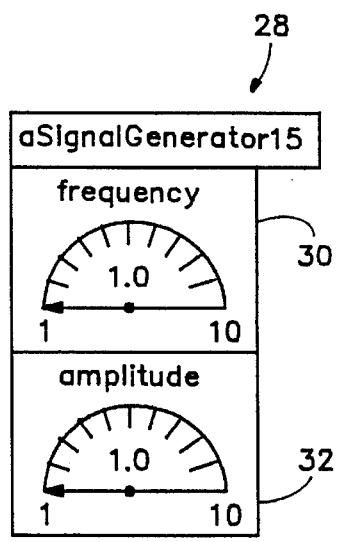
FIGS. 2A–2F are views of virtual front panels for selected virtual instruments.

Signal generator 14 suitably produces a sinewave signal having two variables, frequency and amplitude, as controlled by data provided by the host computer 12 via bus 24. Referring to FIG. 2A, there is depicted a virtual front panel 28 of a virtual instrument associated with signal generator 14. The values of the frequency and amplitude control variables, comprising input parameters of the virtual instrument, are graphically displayed on the screen of terminal 26 in the form of two simulated, dial-type, logarithmic scale meters 30 and 32. As indicated the signal generator 14 has a frequency range of 1 to 10 (e.g. Hertz) and an amplitude range of 1 to 10 (e.g. volts). The meter representations in the FIG. 2A display are illustrative of settings of 1.0 Hertz and 1.0 volts. The value indicated by each analog meter is also digitally displayed in the center of the meter.

Figure 2B:
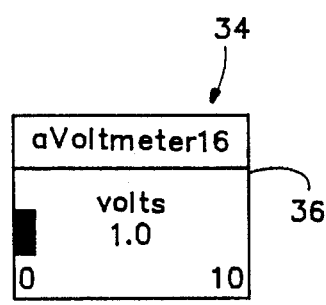

Referring to FIG. 2B, there is depicted a virtual front panel 34 of a virtual instrument associated with the voltmeter 16 of FIG. 1, including a simulated linear bar graph meter display 36 representing the output value of the voltmeter. When the virtual instrument associated with the voltmeter is actuated, it acquires data from the voltmeter indicating the value of the presently measured voltage and adjusts the bar graph meter 36 to display that value. The voltmeter output value is also digitally displayed at the center of the bar graph meter.

Figure 2C:
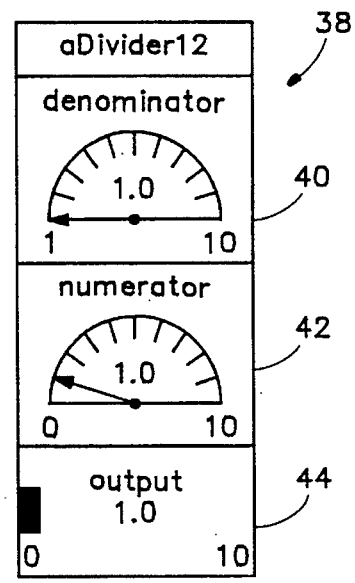

The host computer is further adapted to perform a variety of computational or other functions (such as addition, multiplication and the like) and each such function takes the form of a corresponding virtual machine (such as an "adder", "multiplier", or the like) also graphically represented by a virtual front panel on terminal 22. For convenience, these virtual machines may also be referred to as virtual instruments. Referring to FIG. 2C, the virtual front panel 38 of a "divider" virtual machine is illustrated for dividing a "numerator" parameter by a "denominator" parameter and outputting the result. The front panel includes three simulated meters: one logarithmic scale meter 40 displays the value of the "denominator", a second linear scale meter 42 displays the value of the "numerator", and a third linear graph meter 44 displays the divided result or "output".

Figure 2D:
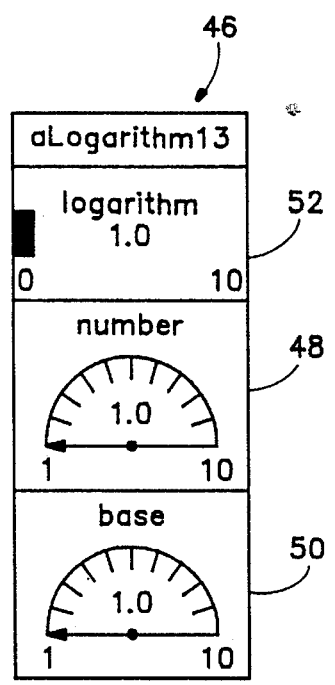
Figure 2E:
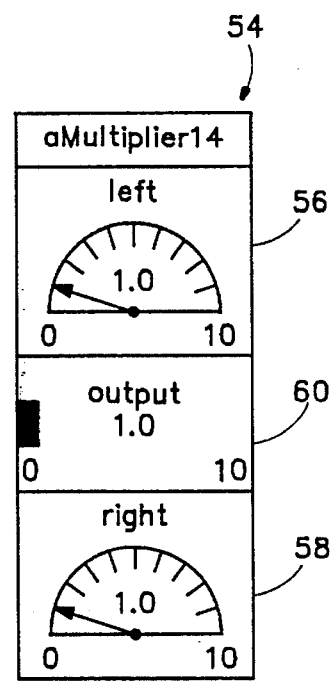

Referring to FIG. 2D a front panel 46 for a "logarithm" virtual machine, capable of obtaining the logarithm of any input "number" parameter number from 1 to 10 to any base from 1 to 10 (by way of example), includes a logarithmic dial meter 48 for displaying the input "number" parameter, a logarithmic dial meter 50 for displaying a selected input "base" parameter, and a linear graph meter 52 for displaying a "logarithm" parameter output. In FIG. 2E, a front panel 54 for a "multiplier" virtual machine, capable of producing an output parameter having a value equal to the product of two input parameter values, includes a linear scale meter 56 for showing the value "left" of one input value, a linear dial meter 58 for showing the value "right" of another input value, and a linear graph meter 60 "output" for showing the value of the product of the left and right input parameter values. It is apparent that many other virtual machines are possible and the foregoing are described only by way of example.

The present invention permits an operator to synthesize a higher order virtual machine for performing any selected sequence of operations, wherein each operation of the synthesized virtual machine is carried out by one or more selected pre-existing virtual machines in a given sequence. Referring to FIG. 1, and assuming that device under test 20 is, for example, an amplifier, the operator may wish to synthesize a "gainmeter" virtual instrument for determining the gain of the amplifier at some selected input voltage and frequency. To test amplifier gain, the signal generator 14 is set to produce a signal of the selected voltage and frequency, and this signal is applied to the amplifier input. The resulting amplifier output voltage is measured by voltmeter 16 and the gain G of the amplifier is computed according to the following equation:

$$G = 20 * Log_{10}(V2/V1). \quad [A]$$

where V2 is the output voltage of the amplifier measured by the voltmeter and V1 is the output voltage of the signal generator. Thus a gainmeter virtual instrument would implement an operation involving the use of a signal generator virtual instrument to produce V1, a voltmeter virtual instrument to produce V2, a divider virtual instrument (machine) to compute the ratio of V2 to V1, a logarithm virtual instrument (machine) to find the log to the constant base 10 of the output (V2/V1) of the divider virtual instrument, and a multiplier virtual instrument (machine) to find the product of a constant (20) and the output $Log_{10}(V2/V1)$ of the logarithm virtual instrument.

Figure 2F:
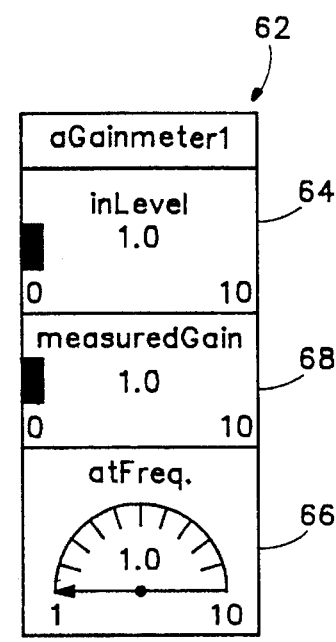

Referring to FIG. 2F, a virtual front panel 62 is illustrated representing such a gainmeter virtual instrument, and includes meters 64 and 66 for displaying the values "inLevel" and "atFreq" for the voltage and frequency of the input signal applied, and a meter 68 for displaying the value "measuredGain" determined by the synthesized gainmeter.

Software adapted to implement the preferred embodiment of the present invention is provided by way of example in the "Smalltalk-80" language. This language is described in detail in a book entitled *Smalltalk-80, The Language and its Implementation*, written by Adele Goldberg and David Robson and published by the Addison-Wesley Publishing Company in 1983, incorporated herein by reference. The Smalltalk-80 language treats numbers, character strings, programs, computational processes and the like as "objects" consisting of private memory for storing variables and a set of instructions ("methods") for carrying out procedures in response to messages received from other objects. All similar objects comprise an object "class" with each individual object constituting an "instance" of its class. Each different type of virtual machine implemented in computer 22 comprises a separate object class and each virtual machine within a class is an instance of a class. For example, a class of virtual machines called "Divider" may include several examples of dividers, each operating in an identical fashion but used in different applications. A class may also be "empty" in the sense that while the operation of a virtual machine for the class is defined, there are no instances of the class being used in any application.

When an operator wishes to synthesize a new virtual instrument, such as a gainmeter, he creates new instances for every existing virtual instrument (machine) needed to perform the sequence of operations represented by the new virtual instrument. Referring to FIG. 3A, a "generator list" 70 is suitably initially displayed as a window on the screen of terminal 26 when the system is loaded on the host computer 22. The generator list 70 lists the names of all existing virtual instrument classes. In this example, five virtual instrument classes are pre-existing: "Divider", "Logarithm", "Multiplier", "SignalGenerator", and "Voltmeter". At the same time, an instance or instrument list 72, shown in FIG. 3B, naming every instance of each class, is suitably displayed in a different window on the screen. In the particular example of FIG. 3B the instrument list 72 is empty, since no instance of any virtual instrument class has been created.

In order to synthesize the gainmeter virtual instrument, it is necessary to create new instances of the Divider, Logarithm, Multiplier, SignalGenerator and Voltmeter classes because the gainmeter virtual instrument will utilize one instance from each of these classes in carrying out its function. To create such a new instance of a class, the operator selects the class by using the mouse connected to terminal 26 to move a cursor over the name of the class, such as "Divider" in the generator list 70, and presses and releases the red mouse button to select the "Divider" name. Then the yellow button is depressed causing a first command menu 74, as shown in FIG. 3C, to appear as a further window on the terminal screen. This first command menu displays a set of five command names: "new instance", "synthesize", "add", "delete", and "inspect me". The operator then moves the cursor over the "new instance" command name and releases the yellow mouse button. Thereupon the first command menu window closes, and a new instance of the Divider class is created. The name of the new instance of the Divider class, "aDivider12", is added to the instrument list 72 as shown in FIG. 3D, and a virtual front panel for the instrument, similar to that shown in FIG. 2C, is displayed in another window on the screen of terminal 26. The name "aDivider12" is displayed at the top of the virtual instrument panel and indicates the instrument belongs to the Divider class. The number "12" at the end of the instance name is an arbitrary but unique number for each virtual instrument instance, used to distinguish this virtual instrument instance from any other virtual instrument instance.

In a similar manner, the operator uses the cursor and the first command menu 74 of FIG. 3C to create new instances of the Logarithm, Multiplier, SignalGenerator, and Voltmeter classes. Thereafter the instance or instrument list would appear as illustrated in FIG. 3E, listing the names of the new virtual instrument instances, "aDivider12", "aLogarithm13", "aMultiplier14", "aSignalGenerator15", and "aVoltmeter16". The virtual front panels associated with each new virtual instrument instance, similar to those depicted in FIGS. 2A–2D, are also displayed as separate windows on the screen of terminal 26.

Next, in order to create a new virtual instrument such as a gainmeter, the operator must create a new class, the class being assigned a suitable name such as "Gainmeter". To create the new class the operator presses the yellow mouse button to cause the first command menu 74 of FIG. 3C to be displayed, moves the cursor over the "add" command, and then releases the yellow mouse button. The system then closes the first command menu window and opens a dialog window 78, as illustrated in FIG. 3F, containing an upper portion 76 displaying a character string "add generator named:", and a lower portion 80 for displaying a character string naming the new class, when provided by the operator. The operator types in the class name, such as "Gainmeter", using the keyboard of terminal 26 and actuates a return button on the keyboard. The dialog window is then closed and the name "Gainmeter" is added to the generator list 70 as illustrated in FIG. 3G. At this time the system automatically produces software necessary to establish the new class according to a standard predefined template.

Once the Gainmeter class is created, the operator can "synthesize" the gainmeter, i.e., define the function an instance of the gainmeter class is to perform in terms of the functions which the existing virtual machines or instruments perform. To synthesize the gainmeter, the operator uses the cursor to select the Gainmeter item on the generator list 70 of FIG. 3G and operates a mouse button to open the first command menu 74 of FIG. 3C. The operator then employs the cursor and a yellow mouse button to select the "synthesize" command from the first command menu thereby causing the system to close the first command menu window and to display a new "synthesizing" window 82 as illustrated in FIG. 4. The synthesizing window includes three regions, a top region 84 for defining the virtual front panel associated with the virtual instrument being synthesized, a middle region 86 for displaying a Smalltalk listing of a procedure to be performed by the virtual instrument as it is generated, and a bottom region 88 containing a list of the input and output parameters associated with the procedure as well as output parameters for lower level virtual instruments and temporary variables. The parameters don't appear until the operator defines them.

An end product of the synthesizing process is a Smalltalk listing, displayed within region 86, of a method named "runMe" which performs the gainmeter function, i.e., which accepts input data indicating the voltage and frequency of a signal to be applied to an input of a device under test, adjusts the signal generator of FIG. 1 to produce such a signal, obtains the output voltage of the device measured by the voltmeter of FIG. 1, and computes the gain from the signal generator output voltage and the voltmeter reading. It is convenient to first discuss the completed listing for the runMe method of the gainmeter and then describe how the present invention assembles it. The Smalltalk code for the runMe method is as follows:

| | |
|---|---|
| runMe | [1] |
| \|q5 q4 q3 q2 q1 t\| | [2] |
| "Gainmeter" | [3] |
| "1 October 1985" | [4] |
| t ←(Generator InstrumentList) at: 'aSignalGenerator15'. | [5] |
| t frequency: (self atFreq). | [6] |
| t amplitude: (self inLevel). | [7] |
| q1 ←t runMe. | [8] |
| t ←(Generator InstrumentList) at: 'aVoltmeter16'. | [9] |
| q2 ←t runMe. | [10] |
| t ←(Generator InstrumentList) at: 'aDivider12'. | [11] |
| t denominator: (self inLevel). | [12] |
| t numerator: (q2). | [13] |
| q3 ←t runMe. | [14] |
| t ←(Generator InstrumentList) at: 'aLogarithm13'. | [15] |
| t number: (q3). | [16] |
| t base: 10. | [17] |
| q4 ←t runMe. | [18] |
| t ←(Generator InstrumentList) at: 'aMultiplier14'. | [19] |
| t left: 20. | [20] |
| t right: (q4). | [21] |
| q5 ←t runMe. | [22] |
| ^ self measuredGain: q5 "Replace Me" | [23] |

Line [1] is the title of the method, runMe. Line [2] declares q5, q4, q3, q2, q1 and t as temporary variables. Line [3] is a comment identifying the runMe method as being associated with the Gainmeter and line [4] is a comment indicating the date when the runMe method was created. In line [5] the variable t is made to reference the aSignalGenerator15 object on the Generator InstrumentList. In other words, when the variable t is then used to designate an object, the designated object is the aSignalGenerator15 virtual instrument. In line [6] a message is sent to the aSignalGenerator15 virtual instrument which assigns the value of the Gainmeter (referenced by the word "self") input parameter atFreq to the frequency input parameter of aSignalGenerator15. In line [7] a message is sent to the aSignalGenerator15 object which assigns the value of the gainmeter input parameter inLevel to the amplitude input parameter of aSignalGenerator15. In line [8] a "runMe" message is sent to the aSignalGenerator15 virtual instrument which causes it to set the frequency and amplitude controls of the signal generator 14 of FIG. 1 consistent with the atFreq and inLevel input values provided in lines [6] and [7]. Also in line [8] an output of the aSignalGenerator15 runMe method, an indication of method completion, is assigned to a variable q1.

In line [9] the t variable is reassigned to reference the aVoltmeter16 virtual instrument on the generator instrument list and in line [10] a runMe message is sent to the aVoltmeter16 virtual instrument causing it to acquire the output voltage measured by the voltmeter 16 of FIG. 1 and to assign the value of the measured voltage (V2 in equation [A] hereinabove) to another variable q2.

In line [11] the variable t is reassigned to reference the aDivider12 virtual instrument and in lines [12] and [13] messages are sent to aDivider12 causing it to assign the value of the inLevel gainmeter input parameter (V1 in equation [A] hereinabove) to the denominator parameter of aDivider12 and to assign the q2 variable (i.e., V2) of line [10] to the numerator parameter of aDivider12. In line [14] a runMe message is sent to aDivider12 causing it to divide the numerator parameter by the denominator parameter thereby producing an output quantity equal to V2/V1. Also in line [14] the aDivider12 output is assigned to another variable q3.

In line [15] the variable t is reassigned to reference the aLogarithm13 virtual instrument and in lines [16] and [17] messages are sent to aLogarithm13 causing it to assign the value of the q3 variable (V2/V1) to the number parameter of aLogarithm13 and to assign the constant 10 to the base parameter of aLogarithm13. In line [18] a runMe message is sent to aLogarithm13 causing it to produce an output quantity equal to the log to the base 10 of number (i.e., $Log_{10}$(V2/V1)). This quantity is assigned to the variable q4.

In line [19] the t variable is reassigned to reference the aMultiplier14 virtual instrument and in lines [20] and [21] messages are sent to aMultiplier14 requesting it to assign the constant 20 to its left parameter and to assign the variable q4 produced in line 18 as its right parameter. In line [22] a runMe message is sent to aMultiplier14 causing it to produce an output quantity equal to the 20 times q4, i.e., $20Log_{10}$(V2/V1). This output quantity is assigned to the variable q5. Finally, in line [23], the measured gain of the device under test q5 is assigned as the Gainmeter output parameter, measuredGain, and this value is returned.

The above runMe method listing for the gainmeter virtual instrument is produced during the synthesis process and displayed in region 86 of the synthesizing window 82 of FIG. 4. Initially, when the window is opened, lines [1]–[4] are automatically displayed in region 86, followed by a fifth line:

| | |
|---|---|
| ^ self myValue: self myValue "replace me" | [23a] |

This last line is a precursor to line [23] of the runMe listing wherein the instance of "myValue:" is a dummy variable subsequently to be replaced during the synthesizing process by "measuredGain:" and wherein the following "self myValue" dummy expression is subsequently to be replaced by the "q5" variable as described hereinbelow. The remaining lines [5]–[22] are also inserted into the listing during the synthesizing process.

Referring again to the synthesizing window 82 of FIG. 4, the top region 84 of window 82 is divided into three subregions. The first subregion 90 of top region 84 contains a list of the names of the input and output parameters of the synthesized virtual instrument. Initially subregion 90 is empty because the input and output parameters of the instrument have not been defined. A second subregion 92 of window region 84 contains a list of parameter types and a pair of selection boxes 94 and 96 for indicating whether a parameter is an input or an output of the synthesized virtual instrument. In this example, the possible parameter types include "function" (e.g., selection from a list such as square, sine, triangle), and "number" (a floating point decimal number). However, in other applications, other types of parameters may be included in the parameter type list including integers, character strings, binary numbers, etc. A third subregion 98 of window region 84 includes a list of the possible types of virtual front panel displays available for each parameter including in the present example, "linearGraph", "linearMeter", "logGraph", and "logMeter" which are adapted to display the value of a number. The "volts" display 36 of the voltmeter virtual front panel of FIG. 2B is an example of a linearGraph display wherein the value of a parameter is displayed as a bar of proportional length. The "left" meter 56 of the multiplier virtual front panel of FIG. 2E is an example of a linearMeter display wherein the value of a parameter is proportional to the position of a pointer on a dial. The "inLevel" display 64 and the "atFreq" 66 displays of the gainmeter of FIG. 2F are examples of the logGraph and logMeter displays wherein, respectively, the value of parameter is logarithmically proportional to the length of a bar or the position of a pointer on a dial. In other applications of the present invention, the list of possible displays in subregion 98 may be expanded to provide for displays of other types of parameters including, for example, an alphanumeric readout for displaying character strings, simulated lamps for displaying binary parameter states, selectors from lists, etc.

The operator may define an input or output parameter for the synthesized instrument by adding it to the parameter list in subregion 90. First the cursor is moved over the subregion and a yellow mouse button is pressed to open a second command menu window 100 as illustrated in FIG. 3H superimposed over region 90. This window includes four commands, "add", "delete", "new instance" and "inspect parameter". The operator then moves the cursor over the "add" command and releases the mouse button. The system then closes the second command window and opens a dialog window similar to that shown in FIG. 3F, except requesting "add parameter named". At this point the operator types the name of a parameter such as "atFreq" and then presses a carriage return button on the terminal keyboard. The system displays the name "atFreq" in subregion 90 with the name highlighted and also highlights the "input" selection box in subregion 92 as well as the "linearGraph" display type in subregion 98, to indicate that the highlighted parameter atFreq is, by default, a floating point number input to the gainmeter to be displayed as a linear graph on the virtual front panel for the gainmeter. The operator may change the nature of the front panel display for a parameter in highlighted subregion 90 by placing the cursor over the desired display type in subregion 98 and depressing the red mouse button. Similarly the operator may change the parameter type and whether it is an input or an output by using the cursor and red button to select the appropriate defining words in subregion 92. Next, in the same manner in which the operator used the cursor in the second command window to add and define the atFreq parameter, the operator also adds and defines the "inLevel" and "measuredGain" parameters. At this point all three parameters appear in the input/output parameter list of subregion 90 as seen in FIG. 4.

Each time the operator adds an input or an output parameter to the parameter list of subregion 90, a line is added to region 88 listing the parameter. As shown in FIG. 4, the first line in the "bind list" of region 88 reads "self atFreq" indicating a parameter atFreq has been defined according to the front panel specifications of the gainmeter ("self"), rather than according to the specifications of some other virtual instrument on the instrument list. Similarly, when the operator adds the inLevel and measuredGain parameters to the parameter list of subregion 90, the system displays second and third lines in region 88 reading "self inLevel" and "self measuredGain".

At this point the operator has defined the virtual front panel for the gainmeter, as illustrated in FIG. 2F wherein the gainmeter virtual front panel is analogous to a "real" front panel as would be required for a "real" gainmeter and which could be constructed from hardware components. A real front panel for a gainmeter would include a knob for controlling and indicating output signal frequency, a knob for controlling and indicating output signal voltage, and a meter for displaying gain. In order to construct a "real" gainmeter it would be necessary to interconnect the front panel with inputs and outputs of various hardware components capable of producing a test signal, to measure a voltage and to perform a gain calculation. Similarly, in order to cause the virtual front panel of a virtual gainmeter instrument to operate properly it is necessary to create the runMe code for the gainmeter virtual instrument for directing the flow of messages which "interconnect" the gainmeter virtual front panel with the aDivider12, aLogarithm13, aMultiplier14, aSignalGenerator15 and aVoltmeter16 virtual instruments, in a fashion analogous to the wired interconnection of corresponding hardware instruments.

First, the operator selects the first virtual instrument to be utilized by the gainmeter, aSignalGenerator15, by moving the cursor over the displayed virtual front panel for the aSignalGenerator15, illustrated in FIG. 2A, and clicking a button on the mouse. The "a SignalGenerator15" label on the front panel is then highlighted to indicate the selection. To test the operation of the virtual signal generator and the corresponding real signal generator, the operator may set test values for the frequency and amplitude input parameters of the virtual signal generator, operate the virtual signal generator and then measure the output of the corresponding real signal generator to see if it produces a signal with the desired voltage and frequency characteristics. To adjust an input parameter of a virtual instrument after selecting the instrument, the operator moves the cursor over the meter area of a panel meter or a bar graph meter, depresses a red selection button on the mouse, moves the cursor to move the pointer or the bar to the desired position on the meter, and releases the red button. This is analogous to moving a knob or a slide control on a real front panel. Alternatively, the operator may select a meter and then operate a yellow button on the mouse to open a third command menu window 102 as illustrated in FIG. 3I listing "generate", "run", "stop", "inspect me" and "set parameters" commands. When the operator selects the set parameters command with the cursor, third command menu window 102 is replaced with a dialog window 104 as illustrated in FIG. 3K. In the example of FIG. 3K the operator has select ed the frequency meter of the signal generator virtual front panel 28 of FIG. 2A. The dialog window 104 requests the operator to type in a new value for frequency. In this example, the operator has responded by typing in "1325". When the operator presses the carriage return, the dialog window 104 disappears and the frequency meter 30 of FIG. 2A is set to the new value. Assuming that the operator has now set the frequency parameter to 1325 and the voltage parameter to 5.59, the operator may "run" the signal generator virtual instrument by opening the third command menu window 102 of FIG. 3I and selecting the "run" command. This causes the signal generator virtual instrument to send the frequency and amplitude data to the real signal generator 14 of FIG. 1 along with a signal causing it to operate. The operator may then test the output of the real signal generator to see if it produces a signal of the desired voltage and frequency. After the output of the signal generator 14 is tested, the operator may stop the operation of the signal generator by selecting the virtual signal generator, opening the third command menu window of FIG. 3I, and selecting the "stop" command, thereby causing the virtual signal generator to send a stop instruction to its real counterpart.

Once operation of the virtual signal generator is verified (if such is desired), the code for "connecting" the virtual signal generator to the aGainmeter1 front panel may be synthesized. First, the operator uses the cursor and a red mouse button to select the last line of the listing currently displayed in region 86 of the synthesizing window of FIG. 4. The operator then selects the aSignalGenerator15 front panel, uses a mouse button to open the third command menu window 102 of FIG. 3I, and selects the "generate" command. This causes the system to insert the following code lines immediately preceding the selected line, in this case the last line in region 86:

t ←(Generator InstrumentList) at: 'a SignalGenerator15'.   [5]

t frequency:1325.   [6a]

t amplitude:5.59.   [7a]

q1 ←t runMe.   [8]

These lines are similar to lines [5]–[8] of the completed runMe listing except that in lines [6a] and [7a] the frequency variable is assigned its current test setting of 1325 Hertz and the amplitude variable is assigned its current test setting of 5.59 volts rather than the values of atFreq and inLevel indicated in lines [6] and [7] of the completed listing. At the same time lines [5], [6a], [7a], and [8] are added to the listing in region 86, the q1 variable produced in line [8] is added to the bind list in region 88, as well as to the temporary variable declarations in line 2.

The operator may now "connect" the inLevel and atFreq parameters of the Gainmeter so that the virtual signal generator inputs may be set from the inLevel and atFreq inputs of the Gainmeter. To connect the atFreq parameter to the frequency input of the aSignalGenerator virtual instrument, the operator uses the cursor and a red selection button on the mouse to select line [6a] of the listing in region 86 and the "self atFreq" line of the bind list in region 88 and then operates a yellow selection button on the mouse to open a fourth command menu window 106 as illustrated in FIG. 3J. The fourth command menu window lists the commands "modify code", "delete", "clear", and "inspect". At this time, the operator selects the modify code command which causes the system to modify the code of line [6a] so that it reads as in line [6] of the completed, runMe listing hereinabove by replacing the number 1325 with "(self atFreq)". In a similar fashion, the operator modifies Line [7a] to read as in line [7] of the completed listing by selecting line [7a] in region 86, selecting the "self inLevel" line from the bind list in region 88 and then selecting the modify code command from the fourth command window 106 of FIG. 3J.

Next the operator selects the aVoltmeter 16 front panel 34 of FIG. 2B and may test its operation by applying a known reference voltage to voltmeter 16 of FIG. 1, selecting the "run" command of the third command menu 102, and checking meter 36 of the aVoltmeter16 front panel to see that it properly indicates the reference voltage. The operator then inserts lines [9] and [10] into the runMe listing in region 86 by selecting the last line of the listing, selecting the aVoltmeter16 front panel, and then selecting the "generate" command from the third command menu 102 of FIG. 3I.

t ←(Generator InstrumentList) at:"aVoltmeter16".   [9]

q2 ←t runMe.   [10]

At the same time these lines are inserted into the listing in region 86, the q2 variable is added to the bind list in region 88 and to the temporary variables in line 2 of region 86.

In similar fashion the following lines are added to the listing in region 86 when the operator selects the aDivider12 instrument and the generate command of the command menu 102 of FIG. 3I:

t ←(Generator InstrumentList) at: "aDivider12".   [11]

t denominator: 1.   [12a]

t numerator: 1.   [13a]

q3 ←t runMe.   [14]

The q3 variable is also added to the bind list in region 88 of the synthesizing window 82 of FIG. 4, and to line 2 of region 86. At this point the operator modifies line [12a] to replace the "1" constant with (self inLevel) by selecting line 12a and the "self inLevel" parameter in region 88, and then selecting the modify code command from the command menu 106 of FIG. 3J. The operator also modifies line [13a] in similar manner except that the q2 variable in the bind list of region 88 is selected to replace the constant "1" in line [13a].

In a similar fashion, the operator may select and use the generate and modify code commands of the menu of FIG. 3J to insert code lines [15]–[22] into the runMe listing for the aGainmeter1 virtual instrument displayed in region 86 of the synthesizing window. Finally, the operator must modify the last line [23a] of the code in region 86 to match line [23] of the completed runMe listing. To do so the operator selects line [23a] and uses a mouse button to open a command menu window 108 of FIG. 3L which lists the commands "modify code", "edit code", "add code", clear code", "reset code", "compile message", and "inspect code". The operator selects the "edit code" command in the menu and the menu is then replaced with dialog window 110 as illustrated in FIG. 3M which contains selected code line [23a]. This dialog window permits the operator to use the cursor to indicate the dummy variables to be replaced and to type in the appropriate information (as hereinbefore mentioned) in their place.

With the runMe code for the gainmeter synthesized, the complete code for the gainmeter virtual instrument may now be compiled. To do so, the operator opens the command menu window 108 of FIG. 3L and selects the "compile message" command. Once the code is compiled, the synthesis process for the Gainmeter class is complete and the operator may create an instance of the Gainmeter class by selecting the "Gainmeter" class from the Generator list window 70 of FIG. 3G, opening the command menu window 74 of FIG. 3C (or opening the command window 100 of FIG. 3H in region 90, of the synthesizing window of FIG. 4), and selecting new instance. Thereafter the aGainmeter1 virtual front panel 62 of FIG. 2F is displayed.

This instance of the gainmeter virtual instrument may be operated in the same manner any other virtual instrument is operated. The inLevel and atFreq control inputs may be modified by using the cursor to set the appropriate meter settings (or by typing the desired values into a dialog window) and then selecting the run command from the command menu of FIG. 3I.

When the operator no longer wishes the front panel of a virtual instrument to be displayed, he may select such front panel and then open the blue button menu window 112 as illustrated in FIG. 3N, displaying "under", "move", "frame", "collapse", and "close" commands. The close command removes the selected panel from view, the under command causes a selected window to appear beneath any overlapping windows, and the move command permits the operator to relocate any selected window by using the cursor to move the window across the screen to a new position. The frame command permits the operator to use the cursor to resize a window by moving a corner of the window. The collapse command shrinks a selected window until only its title is shown on the screen. A collapsed window may be opened again by selecting the frame command from the blue button menu. It will be realized that all these functions are performed by commercially available graphics software, such as Smalltalk 80.

Referring to FIG. 3C, the command menu 74 includes a delete and an inspect me command in addition to the new instance, synthesize and add commands previously discussed. The operator may delete an instrument class by selecting the class on the generator list 70 of FIG. 3G, opening command menu 74 of FIG. 3C and selecting the delete command. The inspect me command invokes a standard Smalltalk feature which enables the operator to obtain information regarding a selected object, in this case a virtual instrument class. The add code command of the command menu of FIG. 3L permits an operator to type in a line of code in a selected location within the runMe listing region 86 and the clear code command permits the operator to clear the entire code. The delete command permits him to delete a selected line of code. The reset code command permits the operator to restore the code to the initial value as in FIG. 4.

The Smalltalk software for the preferred embodiment of the present invention is implemented using three system categories: "MyInstruments", "Synthesizer", and "InterfaceMeters". The MyInstruments system category includes virtual instrument classes. Appendix I also found in parent application Ser. No. 06/798,931, filed Nov. 18, 1985, now U.S. Pat. No. 4,849,880 includes listings for example virtual instrument classes for adding and multiplying.

The Adder virtual instrument class listing appears on the first page of Appendix I and will be discussed in detail by way of example. The other virtual instrument class listings are structured in a similar fashion as will be apparent to those skilled in the art.

Referring to the Adder virtual instrument class listing, line (1) identifies the virtual instrument subclass "Adder" and line (2) defines three instance variables: left, output and right. Lines (3) and (4) indicate the VirtualInstruments class has no class variables and no pool dictionaries. Line (5) identifies the class category, myInstruments.

Each instrument subclass has two groups of instance methods, "parameters" and "set values". The parameters methods include methods to set and read the values of selected instance variables and a runMe method to carry out the operation of the virtual instrument. The setValues methods provide the prompt in dialog windows of the type shown in FIG. 3K when the operator uses the "set frequency" command of the command menu of FIG. 3I to specify a frequency value. When a different meter is selected, the word frequency in menu 102 is replaced by the name of the parameter displayed by the meter.

Line (6) introduces the parameter methods and line (7) defines a first parameter method corresponding to the selector "left" which returns the value of the left variable to any object sending a "left" message to the adder. If the value of the left variable has never been set, i.e., it is "Nil", the method sets the value of the left parameter to 1 and returns 1 as the parameter value. This line also includes comments indicating the date when the method was last modified, the variable type (number), the type of meter used to display the variable (linearGraph), and whether the variable is an input or an output. Line (8) defines a second parameter method responding to the selector "left:". This method sets the value of the left variable to any value specified in a message of the form left:xx, where xx is the specified value. The method returns the set value of left to the message sender. Similarly, lines (9), (10), (11) and (12) define methods responding to the selectors "output", "output:", "right", and "right:" which permit the interrogation and setting of the output and right variables in the same manner that lines (7) and (8) permit interrogation and setting of the left variable.

Lines (13)–(18) define the parameter method executed in response to a runMe method. Line (13) recites the runMe selector and lines (14) and (15) are comments indicating the class (Adder) and the date of creation of the class. Line (16) defines a temporary variable, t. In line (17) the value of the left parameter and the value or the right parameter are obtained by using the left and right methods of lines (7) and (11). The two values are summed and the sum is assigned to a variable "myValue" which is returned to the object which sent the runMe message. Line 17 also invokes the "output:" method to set the output parameter on the virtual front panel of an adder.

Line (19) introduces the setValues methods, the first of which is defined in line (20) as responsive to a message containing a "setleft" selector. This line returns a character string "left value?" to be placed in a dialog window when the operator is to type in a new parameter value after having invoked the setleft command. The methods of lines (21) and (22) are similar to the method of line 20 except that line (21) relates to the setting of the output parameter and line (22) relates to the setting of the right parameter.

The above listing for the Adder subclass is structured in a fashion which is typical for all virtual instrument subclasses, each having a pair of parameter methods similar to "left" and "left:" of lines (7) and (8) and a setValues method similar to that of line (20) associated with each parameter. Also each has a runMe method similar to that given in the adder example and designed to implement the primary function of the virtual instrument. The code for the runMe method, associated a virtual instrument which sends data to and/or receives data from a real instrument such as a signal generator or a voltmeter, includes provisions for sending data out on the bus to the receiving instrument and/or acquiring data over the bus from the instrument in a well known manner.

Appendix II also found in U.S. Pat. No. 4,849,880 is a listing of a new Smalltalk system category "Synthesizer, according to the present invention, which includes three new Smalltalk classes: "Generator", "ParameterBlok", and "VirtualInstruments". Generator is a new subclass of the standard Smalltalk class "Object" while Parameterblok and VirtualInstruments are new subclasses of the standard Smalltalk class "Number". Each virtual instrument class is a subclass of VirtualInstruments. The Generator class, also diagrammed in FIG. 6, includes instance methods 120 and class methods 122 invoked during the creation of new classes of virtual instruments and new virtual instrument instances, and invoked to control the operation of the virtual instruments instances. The ParameterBlok class, also diagrammed in FIG. 7, includes a class method 124 and an instance method 126 invoked to create and maintain records of the attributes (i.e. name, type, value, meter view, etc.) of the various input and output parameters associated with each virtual instrument. The VirtualInstruments class, also diagrammed in FIG. 8, includes class methods 128 and instance methods 130 also invoked during the creation of virtual instrument instances, providing common display messages for the virtual instrument classes.

The virtual instrument classes are used as "generators" to generate new virtual instrument instances, and these classes are included in a data structure called "GeneratorList". The names of these generator classes are displayed on a generator list 70 illustrated in FIG. 3D. The names of the virtual instrument instances available for a project are displayed on an instrument list 72 as illustrated in FIG. 3E.

Referring to FIG. 6, the generator class is initialized by an "initialize" method which calls an "addGeneratorSpec:parameters:" method to add the available virtual instruments to the generator list and to invoke a "compileGenerator:" method which compiles the generator classes. Initially when an operator opens a project, the operator types and executes the line, "Generator example". This calls the generator class method "example" which in turn calls the methods "displayGenerators" and "displayInstruments" to initiate the display of the generator list 70 of FIG. 3C and the instrument list 72 of FIG. 3B. Once the generator list is displayed, the operator may select a generator using the cursor and the red mouse button, thereby invoking a "wakeGenerators" method which sets a variable indicating the selected generator. The operator may open the generator command menu 74 of FIG. 3C by operation of the yellow mouse button which invokes a "generatorMenu" method for displaying the menu. The operator may delete the selected generator from the generator list by selecting the delete command from the menu, calling a "deleteGenerator" method. The operator may inspect a selected generator by selecting the inspect me command from the menu whereupon an "inspectSelectedGenerator" method is called which invokes a standard Smalltalk inspect method.

The operator may add an instance of a virtual instrument to the instrument list by selecting the appropriate generator on the generator list and then selecting the new instances command on the generator menu 74 of FIG. 3C. An "addInstrument" method is called which obtains the name of the selected generator and passes it to an "addInstrument:" method. The "addInstrument:" method adds the name of the virtual instrument instance to the instrument list and invokes a "newInstance" method which initiates display of the virtual front panel for the new virtual instrument. The "addInstrument:" method also invokes a VirtualInstruments class method "new:" (listed in FIG. 8) which creates the new instance of the instrument and initializes it with a name and a parameter block. The "new:parameters:" method calls a VirtualInstruments instance method "initialize:", setting the values of the parameters in the parameter block associated with the new virtual instrument instance.

The operator may select a virtual instrument instance on the instrument list using the cursor and the red mouse button and may open an instrument command menu 73 as illustrated in FIG. 3P by depressing the yellow mouse button when the cursor is within the instrument list. The front panel of a selected virtual instrument is displayed if the operator selects a "show me" command from the instrument command window, invoking a "showSelectedInstrument" method to initiate the display. The operator may "run" a selected virtual instrument by selecting the run command which calls a "runSelectedInstrument" method for sending a "runMe" message to the selected virtual instrument. The operator may add a new instance of a selected virtual instrument by selecting the add command to invoke the "addInstrument" method discussed hereinabove. The operator may inspect a selected virtual instrument by choosing the inspect command which calls an "inspectInstrument" method invoking the Smalltalk inspect method, and can delete a selected virtual instrument instance by selecting the delete command from the instrument list menu to call for a "deleteInstrument" method for removing the selected instrument from the instrument list. The generate command on the instrument menu is discussed hereinbelow in conjunction with the synthesis process methods.

When a virtual front panel is displayed, the operator may open the meter menu 102 of FIG. 3I by placing the cursor over a meter and operating the yellow button to call for a "makeYBM:" instance method of the virtualInstruments class (FIG. 6). Referring to FIG. 6, the run, stop and inspect me commands invoke, respectively, a "run" method for sending a runMe message to the virtual instrument, a "stopMe" method for sending a stopMe message halting instrument operation, and an "InspectMe" method invoking the Smalltalk "inspect" method. The set parameter command on the meter menu invokes a "setValue" method for opening a dialog window permitting the operator to type in a new value for the parameter displayed by a selected meter and sets the parameter to the new value. The generate command on the meter menu will also be discussed hereinbelow in conjunction with the synthesis process.

In order to synthesize a new generator, the operator first adds the generator to the generator list. To do so the operator uses the add command on the generator command menu 74 of FIG. 3C. Referring to FIG. 6, this command calls an "addGenerator" method for opening a dialog window permitting the operator to type in the name of the new generator and then calls an "addGenerator:" method which adds the generator name to the generator list and invokes a generator "new:" method. The "new" method creates a new generator instance and provides an instance method "initialize:" which creates the initial Smalltalk code listing for the runMe method for the new generator class. This initial listing includes the runMe code lines [1]–[4] and [22a] described hereinabove. These lines are obtained by a call to an "initialCodeList:" Generator class method which returns the code lines. The "initialize" method also initializes parameter and bind lists for the generator. After the "addGenerator:" method is completed, the "addGenerator" method invokes a "compileGenerator:" method which creates the new class by calling a standard Smalltalk method subclass:instanceVariableNames:classVariableNames:poolDictionaries:category:. The method "compileGenerator:" invokes the "makeParameterMessage:in:" Generator instance method which creates the parameter methods for the generator.

Once a generator appears on the generator list, the operator may "synthesize" the generator (i.e., alter its function) by opening the synthesis window. When the operator selects a generator to be synthesized from the generator list and utilizes the synthesize command on the generator menu, a "synthesis" Generator class method is called. This method then invokes the "displaySynthesis" instance method for the selected generator which opens the synthesis window 82 of FIG. 4. The window displays any existing input or output parameters on the parameter list in region 90 of the window and on the bind list in region 88, and displays the runMe code for the generator in region 86. When the operator opens the parameter menu 100 of FIG. 3H, a "parameterMenu" instance method is called to display the menu. The operator may add a parameter to the list by selecting the add command which calls an "addParameter" method for displaying a dialog window enabling the operator to type in a new input/output parameter name. After the name is typed in, "addParameter" passes the name to an "addParameter:" method which forwards the parameter name to an "addParameterToList:" method for adding the parameter to the parameter list. Before adding the parameter to the parameter list the "addParameterToList:" method initializes the parameter attributes (i.e. view, type, input/out) to default values by invoking a "setParameter:blok:" instance method. The "setParameter:blok:" method calls a set of ParameterBlok class instance methods (listed in FIG. 6) "in:", "out:", "name:", "type:", "value:" and "view:". These methods specify the attributes of the parameter. The "addParameter" method also passes the parameter name to a "makeParameterMessage:in:" method which adds the parameter to the list of instance variables for the generator class, adds the variable to the bind list, and creates the instance methods for the class being synthesized for setting and returning the value of the new parameter.

A new parameter is initialized as an input of the "number" parameter type to be displayed on a linear graph. The operator may change these parameter attributes by using the cursor and the red mouse button to select the parameter and then the appropriate parameter attributes in region 84 of the synthesizing window. When either the Input or the Output parameter attribute is selected, or deselected, the "in:" or the "out:" parameter block instance method is invoked to set the input/output attribute for the parameter. When a parameter type (i.e., number or function) or parameter view (i.e., linearGraph, linearMeter, etc.) is selected, a "type:" method or "view:" method is used to set the selected parameter type or view. Whenever the operator selects a parameter on the parameter list, a "wakeParameter:" Generator instance method is called which highlights the selected parameter and the appropriate attributes displayed in region 84 of the window. The "wakeParameter:" method determines the appropriate view, type and input/output parameter attributes by invoking the parameterBlok methods ("view", "type", "in", and "out") and passing the returned data to instance methods ("sView:", "sType:", "myIn:", and "myOut:") which control the highlighting of the attributes. The "wakeParameter:" method then modifies the display by calling a standard Smalltalk method "changed:".

The operator can delete a parameter from the parameter list by selecting the parameter to be deleted and then selecting the delete command from the parameter menu 100 of FIG. 3H, thereby calling for a "deleteParameter" Generator instance method which removes the parameter from the parameter and bind lists and updates the display. The operator can also inspect the parameter by selecting the inspect command from the parameter command menu to call an "inspectParameter" method which in turn invokes the Smalltalk inspect method. The operator can also create a new instance of the selected generator virtual instrument by selecting the "new instance" on the parameter command window of FIG. 3. This calls a "newInstance" Generator instance method which utilizes the generator class method "newInstance" discussed hereinabove.

As part of the synthesizing process, the operator may insert new lines into the runMe listing in region 86 of the synthesizing window 82 of FIG. 4 which cause a synthesized virtual instrument to utilize another virtual instrument to perform a selected operation. First the instance of the selected virtual instrument is selected and then the generate command within menu 73 of FIG. 3P is selected. The generate command of the instance command menu invokes a "generateSelectedInstrument" Generator class method which in turn calls a VirtualInstruments instance method "generate". Selection of the generate command from menu 102 of FIG. 3I calls the "generate" method directly. The "generate" method produces the runMe code lines. These lines are then inserted into the runMe code listing for the generator being synthesized just above a selected existing code line. The "generate" method calls a "nextQuad" Virtual instruments class method which returns the number to be appended to the "q" output variable for the code. "Generate" also adds the new "q" variable to the bind list.

The command menu 106 of FIG. 3J is opened by invoking a "bindMenu" Generator instance method and the code command menu 73 of FIG. 3P is opened by calling a "codeMenu" Generator instance method. When the operator selects a line of runMe code in region 86 of the synthesizing window, and a parameter on the bind list in region 88, and then selects the modify command on the bind command menu, or the modify code command on the code menu, a "modifyCode" method is called. The "modifyCode" method changes the quantity to right of the colon on the selected code line to reference the selected bind list variable. The delete command on the bind menu 106 of FIG. 3J initiates a "deleteBind" method which removes a selected parameter from the bind list while a clear command on the bind menu calls a "clearBindList" method to remove all parameters from the bind list. An inspect command on the bind menu invokes an "inspectBindList" menu which in turn calls the system inspect methods to permit the operator to inspect the bind list.

The operator can more directly edit the runMe code lines in synthesizing window region 86 by using other code menu commands. These additional code commands and methods permit an operator skilled in programming to develop virtual instrument primitives for carrying out functions not implemented by existing virtual instruments. A delete command invokes a "deleteCode" method which removes a selected line from the code list. An edit command calls an "editCode" method which opens a dialog window similar to window 110 of FIG. 3M containing a selected line of code. An inspect code command invokes the system inspect method through an "inspectCode" method, thereby permitting the operator to inspect the code list. An add code command uses an "addCode" method which opens a dialog window permitting the operator to type in a new code line. The "addCode" method in turn calls an "insertCode:" method which inserts the dialog window code line into the code list just above a selected line, or at the end if no line is selected. A reset code command calls a "resetCode" method which returns the runMe code to its initial state, thereby removing all but the first four and last runMe code lines. A clear command invokes a "clearCode" menu which deletes every line from the code list. The operator selects a compile message command when the code list is complete and this command calls a "compileMessage" method which concentrates the runMe code list to a character string and sends it to the system compiler.

The following ParameterBlok instance methods return the value of the parameter attribute indicated by the method name: "in", "name", "out", "type", "value", and "view". The following ParameterBlok methods are invoked to set the value of the parameter attribute indicated by the method name: "in:", "name:", "out:", "type:", "value:", and "view:". A ParameterBlok class method "new" is used to create a new parameter block.

In addition to Generator methods discussed above, the Generator class instance methods include additional instance methods employed by the methods described above. The methods "sB", "sC" and "sP" return the currently selected binding parameter on the bind list, the currently selected line of code from the runMe list and the currently selected parameter on the parameter list, respectively. The "sType" and "sView" methods return the currently selected parameter and meter types highlighted in the synthesizer window. A "getBindList" instance method returns the current bind list and an "InstrumentList" class method returns the current instrument list. The class and instance methods "typeList", "viewList", "bindList", "listInstruments" and "parameterList" sort and return the lists suggested by their names. The Generator instance method "codeList" and class method "codeList" both return the runMe code for a selected generator. A "selectedInstrument" method returns the name of an instrument currently selected on the instrument list, while a "selectedSynthesizer" method returns the name of the generator being synthesized. A "setName" method is employed to set an instance variable "instrumentName" to the name of the currently selected instrument while an "instrumentName" method returns the value of the variable. A "selectedBinding" method returns a currently selected line on the bind list. The following methods are utilized when selecting an item from a list: "wakeInstruments:" (when selecting an instrument from the instrument list), "wakeType:" (when selecting a parameter type from the parameter type list of the synthesizing window), "wakeBind": (when selecting a line on the bind list), and "wakeView:" (when selecting a meter from the meter list of the synthesizing window). The class methods "initCode", "initType", and "initView" return the runMe code line, parameter type and meter type currently highlighted in the synthesizing window.

The VirtualInstruments class includes instance methods for providing common display messages for the virtual instrument classes created by the generators. In the preferred embodiment of the present invention three types of displays are possible: bargraph, panel meter, and a "list meter". A list meter displays a list of operating mode options for the virtual instrument having more than one operating mode and the operator may select an operating mode from such a list. For instance, a signal generator virtual instrument may include a list meter allowing the operator to select between squarewave, sinewave, or trianglewave signal generator outputs. A list meter is thus a form of menu and is created by invoking a "listMeter:" method. When the operator accesses the list meter menu a "listMeterMenu:" method is involved which responds to the operators selections. A "parameterMeter" method is invoked to display a bargraph or panel meter and a "display" method is used to update the display of a meter when a virtual instrument parameter value is changed. The method "myParameters:" assigns a current parameter block to an instance variable, wherein "myParameters" indicates the current input parameter values for the instrument. A "myValue:" method sets the value of a "myValue" instance variable, indicating the value of the virtual instrument output variable while a "myValue" method returns the value of the variable. In addition to the "new" method, the VirtualInstruments class methods include "classKounterIncrement" which returns the value of the number to be appended to the generator name when creating the name for a new virtual instrument instance, "nextQuad" (discussed hereinabove) which returns the number to be appended to the next "q" output variable of a line of synthesized runMe code, "resetQuad" which initializes a counter used by the "nextQuad" method, and "zeroKounter" which initializes a counter used by the "classKounterIncrement" method.

Appendix III also found in U.S. Pat. No. 4,849,880 contains a listing of a new Smalltalk system category "Interface-Meters", according to the present invention. The InterfaceMeters category includes a new "MeterView" subclass of the existing Smalltalk "View" class for controlling the display of the meters on the virtual frontpanels associated with each virtual instrument, a new "MeterController" subclass of the existing Smalltalk "MouseMenuController" class for monitoring the cursor position and mouse button operation, and a new "MeterScale" subclass of the existing Smalltalk "Object" class for performing various calculations required by the MeterView when adjusting the display of a meter.

FIG. 5A lists the instance method names for the meter controller class. When the operator moves the cursor over a virtual instrument front panel meter displayed on the screen he may invoke a meter command menu such as 102 of FIG. 3I by operating the yellow mouse button. The operator may also invoke the window view command menu 112 of FIG. 3N by operating the blue mouse button and may change the value of the parameter displayed by using the red mouse button. The MeterController subclass methods monitor mouse button operation and cursor movement when the cursor is within the boundaries of a meter portion of a virtual front panel displayed on the screen. These methods send messages to the MeterView subclass indicating the position of the cursor and mouse button operations. The MeterView subclass uses information contained in these messages to adjust meter parameter values. When the cursor is in a meter window, the operator may adjust the meter reading by positioning the cursor over the meter pointer area (on a panel meter) or over the meter bar area (on a bargraph meter), depressing the red button on the mouse and then "dragging" the pointer or the bar to the desired position on the meter.

The MeterController subclass methods send messages to the MeterView subclass indicating the cursor position and mouse button operations. The MeterView subclass uses information contained in these messages to control the meter display. In the MeterController subclass, the "controlActivity" method determines when the operator has pressed the red mouse button, determines the position of the cursor, and then sends cursor position information to an instance of the MeterView subclass. An "isControlActive" method determines if the meter controller has control and gives precedence to the blue mouse button which opens the view command menu 112 window of FIG. 3N. A "newValueSymbol:" method sets an instance variable (newValueSymbol) to indicate the name of the method of the view to be invoked to send the view the mouse cursor position, while a "newValueSymbol" method returns the value of this variable. A "menuMessageReceiver" method returns the virtual instrument to which this virtual front panel corresponds. A "redButtonMenu:redButtonMessages:" method returns an error message if an attempt is made to set up a menu for the red button, since that button is used to set a graph or a meter.

Figure 5B:
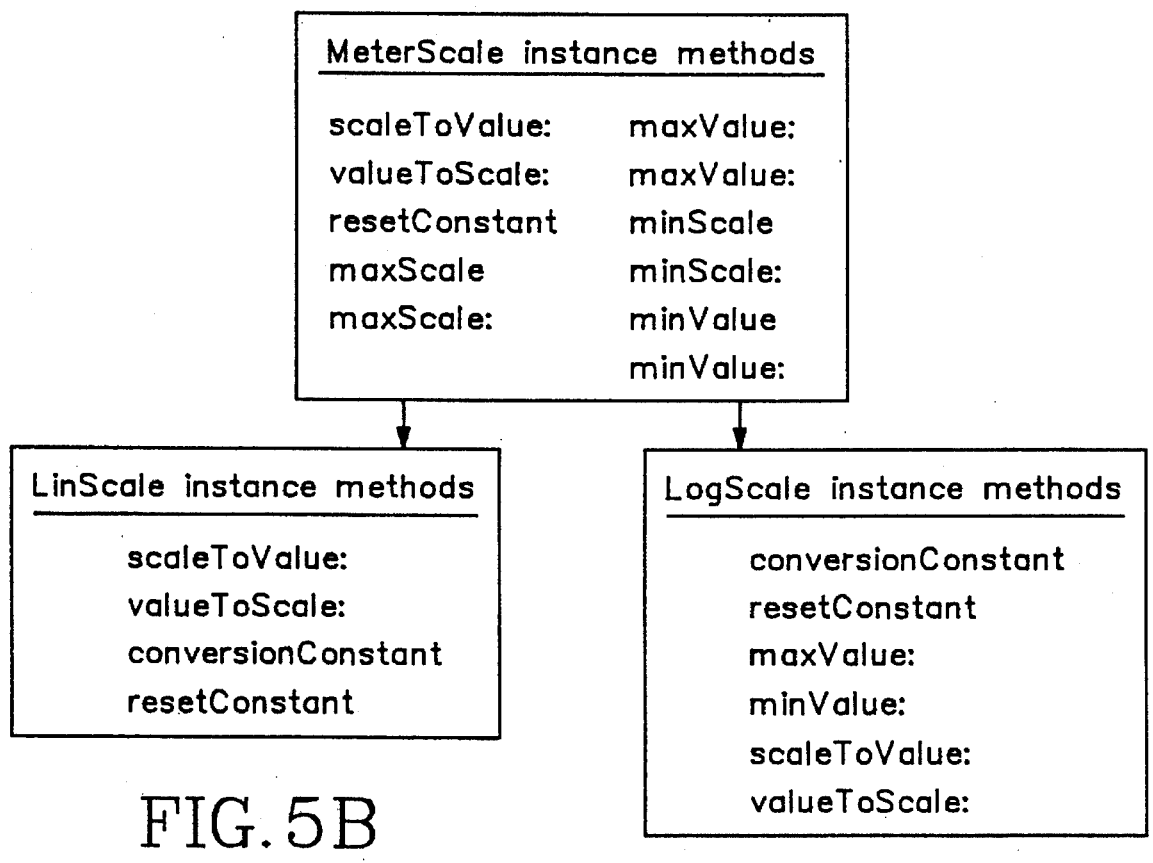
Figure 7:
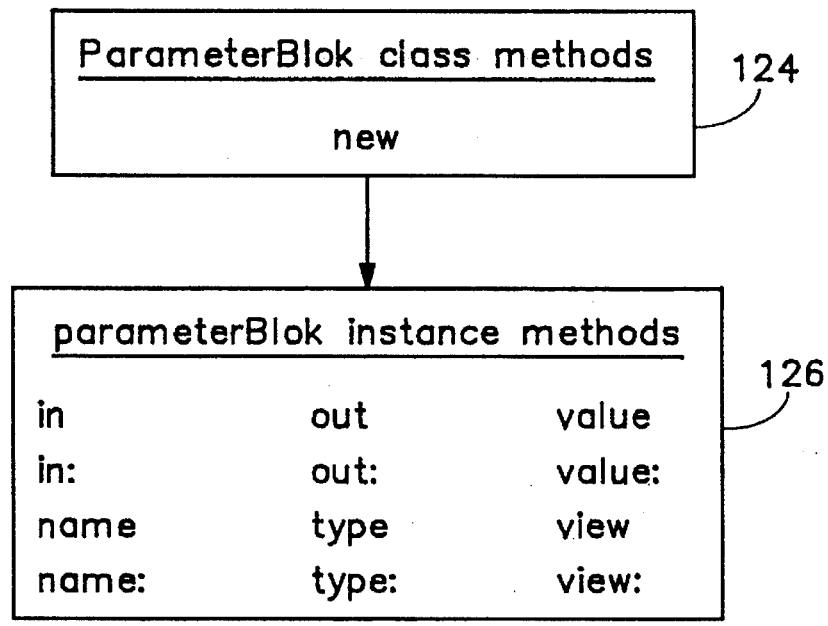
Figure 8:
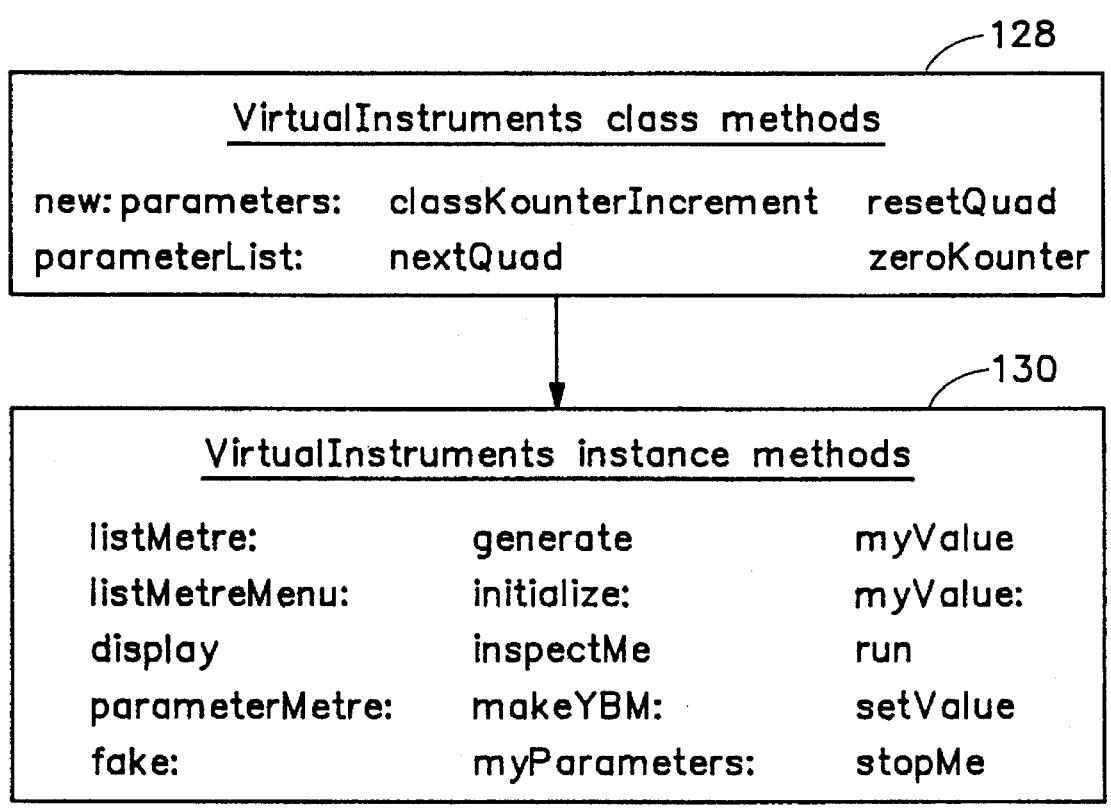

The method structure of the object subclass MeterScale is depicted in FIG. 5B. Meterscale instance methods calculate the position of a panel meter pointer or the bar on a bargraph meter. A meterScale subclass "LinScale" includes methods for calculating a pointer or bar position on a linear scale while another meterScale subclass "LogScale" includes methods for calculating a pointer or bar position on logarithmic scale. The displacement of an indicating pointer or bar along a meter scale is referenced as a "Scale" number while the magnitude of the parameter is referenced as a "Value" number. The MeterScale subclass includes a "scaleToValue:" method, a "valueToScale:" method, and a "resetConstant" method which all return a message indicating that these methods are a subclass responsibility. A "maxScale" method returns the value of the upper limit of a meter scale displacement while a "maxScale:" method sets the upper limit of the Scale number. Similarly, a "maxValue" and a "MaxValue:" method return and set the value of the corresponding upper Value number limit. The "minScale", "minScale:", "minValue", and "minValue:" methods are provided to return and set the lower limits for the Value and Scale numbers.

The LinScale subclass of MeterScale instance methods includes a "scaleToValue:" method for returning the magnitude of a Value number corresponding a selected Scale number and a "valueToScale:" method for returning the magnitude of a Scale number corresponding to a selected Value number. A "conversionConstant" method returns a value of a conversion constant used by the "scaleToValue:" method and "valueToScale:" method. A "resetConstant" method is called to initially set the conversion constant to nil and the conversion constant is recalculated whenever the maximum or minimum value changes (e.g., when a value exceeds the maximum). The LogScale subclass of MeterScale has "conversionConstant", "resetConstant", "scaleToValue:" and "valueToScale:" instance methods which carry out functions similar to those of similarly named LinScale subclass methods but which are adapted to provide the proper conversions for logarithmic scales. The LogScale subclass also includes "maxValue:" and "minValue:" instance methods for setting the maximum and minimum parameter values. The methods override the similarly named methods in the MeterScale subclass.

The method structure of the MeterView class is depicted in FIG. 5C. Each instance of a MeterView subclass controls the display of a virtual instrument front panel meter. An "initialize" method, called when a meter is initially created, associates the meter with the current Smalltalk project, selects a pen to be used for drawing the meter, and then calls a "forceFullDisplayNextTime" method which wipes out any data in an image cache. Thus, when the meter is subsequently drawn onto the screen the meter display must be reconstructed from the meter model and not from the cache. (A saved image of the meter face is used in preference to drawing the meter afresh whenever possible, for reasons of efficiency.) An "itemName:" method sets parameters for display of the meter name. A "maxValue" method and a "maxValue:" method return and set the maximum value of the parameter to be displayed on a meter while a "minValue" method and a "minvalue:" method return and set the minimum value of a number to be displayed. A "scale" method and a "scale:" method return and set the scale of the meter.

A "display" method of the MeterView subclass is called to initiate the display of a meter. As discussed hereinabove, each parameter of each virtual instrument is associated with two parameter methods, one for returning the value of the parameter and one for setting the value of the parameter. A "valueAccessSymbol:" method sets a variable "valueAccess" to the name of a virtual instrument parameter method to return the value of the parameter. A "valueFromModel" method is called to invoke the parameter method of the virtual instrument to return the value of a parameter. The "valueFromModel" method tests for the need to extend, and extends if needed, the limits of the number which may be displayed by the meter when the value returned exceeds the current range of the meter. A "valueChangeSymbol:" method sets a "valueChange" variable to the name of the virtual instrument parameter method for setting the value of the parameter and a "valueChange" method sends a message to the virtual instrument invoking that parameter method thereby setting the parameter to a new value. When parameter values in a virtual instrument change, a single update message containing the "updateOn" variable as its argument may be sent to each MeterView instance controlling each meter associated with the instrument thereby updating each meter display. An "update:" method updates the meter display either based on the last known value of the parameter or by acquiring a new value from the virtual instrument depending on whether the "selfOrSymbol" argument references the meterview or is equal to an "updateOn" variable. An "updateSymbol:" procedure sets the "updateOn" variable.

A single MeterView class procedure, "withScale:", is called to create a new instance of a meter with a scale (either linear or logarithmic) specified by the argument. In order to display the value of a parameter on a meter, it is necessary to convert that value to an equivalent position on the meter. In the case of a bargraph meter the equivalent position is found in terms of horizontal displacement between the maximum and minimum scale positions while in the case of a panel meter the equivalent position is found in terms of an angular displacement along the meter. In the "BarGraphView" subclass of MeterView a "displayView" instance procedure provides the detailed instructions for drawing a bar graph meter and makes use of the appropriate MeterScale procedures to convert parameter values into equivalent meter position. A "newValue:" method changes the parameter value displayed on a meter in response to a message from the meter controller indicating the location of the cursor on the meter when the operator is using the red mouse button to change the meter reading. An "initScale" method is provided to set the initial value of the scale minimum when the meter is initially created.

The PanelMeterView subclass of MeterView includes a "displayView" instance method including instructions for drawing a panel meter and an "initScale" instance method which initially sets the minimum and maximum scale positions to −90 degrees and +90 degrees, respectively, thereby specifying a 180 degree full range scale. A "newValue:" instance method sets the current value of a displayed parameter to the value indicated by the current cursor position on the meter when the operator is using the red button to set the parameter value.

Once a virtual instrument class is synthesized according to the method described hereinabove the operator may create instances of the class which may be independently run to instruct the computer to perform a selected sequence of operations. In addition to utilizing a virtual instrument instance as an independent means to control computer operation, the operator may also utilize an instance of a synthesized virtual instrument for synthesizing other virtual instruments. For example, several instances of the synthesized gainmeter described hereinabove may be incorporated into a synthesized "frequency-response" virtual instrument for measuring the frequency response of an amplifier wherein each instance of the gainmeter is utilized to measure amplifier gain at a different frequency. The measuredGain outputs of each gainmeter may then be displayed on a group of contiguous bargraph meters to form a frequency response curve.

Therefore, the present invention provides a means for an operator to program a computer in a structured fashion by synthesizing a hierarchy of virtual machines with each successive virtual machine incorporating the functions of previously synthesized machines. The invention thus permits an operator not skilled in computer programming to create a virtual machine for performing a complex set of operations by first synthesizing and testing a set of less complex virtual machines for carrying out portions of the complex set of operations and then synthesizing the complex virtual machine based on the less complex machines.

While the preferred embodiment of the present invention described hereinabove is adapted to produce software for use in conjunction with a computer-based instrument system, the present invention may be adapted to produce software for other applications including, but not limited to, instrumentation control and data processing applications. Therefore, while a preferred embodiment of the present invention has been shown and described, it will be apparent to those skilled in the art that many changes and modifications may be made without departing from the invention in its broader aspects. The appended claims are consequently intended to cover all such changes and modifications as fall within the true spirit and scope of the invention.

APPENDIX I

/usr0/bhaskar/myInstruments.st last modified Sep 12 10:20 1985    Page 1

```
(1)  VirtualInstruments variableSubclass: #Adder
(2)      instanceVariableNames: 'left output right '
(3)      classVariableNames: ''
(4)      poolDictionaries: ''
(5)      category: 'myInstruments'!

(6)  !Adder methodsFor: 'parameters'!
(7)  left  " 28 August 1985 "  " type:number view:linearGraph in:true out:false "   ( left isNil ) ifTrue: [ ^ left _ 1 ]. ^ left!
(8)  left: t  " 28 August 1985 "  " type:number view:linearGraph in:true out:false "   ^ left _ t!
(9)  output  " 28 August 1985 "  " type:number view:linearGraph in:true out:false "   ( output isNil ) ifTrue: [ ^ output _ 1 ]. ^ output!
(10) output: t  " 28 August 1985 "  " type:number view:linearGraph in:true out:false "   ^ output _ t!
(11) right  " 28 August 1985 "  " type:number view:linearGraph in:true out:false "   ( right isNil ) ifTrue: [ ^ right _ 1 ]. ^ right!
(12) right: t  " 28 August 1985 "  " type:number view:linearGraph in:true out:false "   ^ right _ t!
(13) runMe
(14)     " Adder "
(15)     " 28 August 1985 "

(16)     | t |
(17)     self output: (myValue _ self left + self right).
(18)     ^myvalue! !

(19) !Adder methodsFor: 'setValues'!
(20) setleft|v| v _ FillInTheBlank request: 'left value?' initialAnswer: #nil. self left: v asNumber; changed: #metreValue!
(21) setoutput|v| v _ FillInTheBlank request: 'output value?' initialAnswer: #nil. self output: v asNumber; changed: #metreValue!
(22) setright|v| v _ FillInTheBlank request: 'right value?' initialAnswer: #nil. self right: v asNumber; changed: #metreValue! !
```

/usr0/bhaskar/myInstruments.st last modified Sep 12 10:20 1985 Page 2

```
VirtualInstruments variableSubclass: #Multiplier
    instanceVariableNames: 'left output right '
    classVariableNames: ''
    poolDictionaries: ''
    category: 'myInstruments'!

!Multiplier methodsFor: 'parameters'!

left " 28 August 1985 " type:number view:linearGraph in:true out:false "  ( left isNil ) ifTrue: [ ^ left _ 1 ]. ^ left!

left: t " 28 August 1985 " type:number view:linearGraph in:true out:false "  ^ left _ t!

output " 28 August 1985 " type:number view:linearGraph in:true out:false "  ( output isNil ) ifTrue: [ ^ output _ 1 ]. ^ output!

output: t " 28 August 1985 " type:number view:linearGraph in:true out:false "  ^ output _ t!

right " 28 August 1985 " type:number view:linearGraph in:true out:false "  ( right isNil ) ifTrue: [ ^ right _ 1 ]. ^ right!

right: t " 28 August 1985 " type:number view:linearGraph in:true out:false "  ^ right _ t!

runMe
    " Multiplier"
    " 11 September 1985"

| t |
    self output: (myValue _ self left * self right).
    ^self myValue " replace me"! !

!Multiplier methodsFor: 'setValues'!

setLeft|v| v _ FillInTheBlank request: 'left value?' initialAnswer: #nil. self left: v asNumber; changed: #metreValue!

setOutput|v| v _ FillInTheBlank request: 'output value?' initialAnswer: #nil. self output: v asNumber; changed: #metreValue!

setRight|v| v _ FillInTheBlank request: 'right value?' initialAnswer: #nil. self right: v asNumber; changed: #metreValue! !
```

APPENDIX II

/usr0/bhaskar/Synthesizer.st last modified Sep 12 10:12 1985   Page 1

Object subclass: #Generator
    instanceVariableNames: 'instrumentName parameterList sP codeList sC bindList sB sType sView myIn myOut kounter '
    classVariableNames: 'GeneratorList InstrumentList Kounter SelectedGenerator SelectedInstrument SelectedSynthesizer TypeList ViewList '
    poolDictionaries: ''
    category: 'Synthesizer'!

Generator comment:
'an instance of a Generator is used
in synthesizing new classes of virtual instruments.
The state of each generator is determined from the following:

Generator instance variables instrumentName    - holds the class name
parameterList     - dictionary of parameter name - parameter block associations
sP                           - currently selected parameter in parameter list
codeList          - ordered list of strings for runMe message currently being synthesized
sC                           - currently selected string in codeList
bindList                     - dictionary containing entry for each parameter for use in synthesizing code
sB                           - currently selected binding
'!

!Generator methodsFor: 'initialize'!

addParameter: aName
    "
    - creates parameter block aName in my parameter list
    - creates methods for acessing/setting parameter
    - adds parameter name to class instance variable list
    - adds binding string
    "
    self addParameterToList: aName.
    self makeParameterMessage: aName in: SelectedSynthesizer! !

addParameterToList: aName
    "
    - creates a new parameterBlock and
      adds it to the parameter list for this instrument
    "
    self changeRequest ifFalse: [^self changed: #wakeParameter].
    parameterList at: aName put: (self block: aName).
    self changed: #wakeParameter! !

block: aName
    "
    creates and initializes new Parameter block --
    used to describe the attributes and value of
    a parameter for a generator or instrument.
    "
    | newBlok |
    newBlok ← ParameterBlok new.
    self setParameter: aName blok: newBlok.
    ^newBlok! !

getSelectedParameter
    "
    returns the parameter block
    for the currently selected parameter
    in the currently selected synthesizer /usr0/bhaskar/Synthesizer.st last modified Sep 12 10:12 1985    Page 2

```
sP isNil
    ifTrue: [
        ^nil].
^self getParameters at: sP
    ifAbsent: [
        [self notify: 'selected parameter not found', sP.
        ^nil]!

initialize: aName
    "
    set instance variables for a new generator
    "
    self setName: aName.
    parameterList _ Dictionary new.
    codeList _ Generator initialCodeList: aName.
    sC _ codeList last.
    bindList _ Dictionary new.
    sView _ #linearGraph.
    myIn _ true.
    myOut _ false!

makeParameterMessage: aName in: aClass
    "
    does all tahe work of
    generating  stuff for new parameters
    "
    | pName codeString newClass lastCode index newlastCode comments pBlok |
    pName _ aName asSymbol.
    "
    add my name to the
    list of class instance variable names
    "
    (Smalltalk at: aClass
        ifAbsent: [
            [self notify: 'mP'.
            ^nil])
        addInstVarName: pName.
    "
    set up binding for input variables only
    "
    (pBlok _ parameterList at: aName ifAbsent: [self notify: 'missing p'!]) in
        ifTrue: [(GeneratorList at: aClass
            ifAbsent: [
                [self notify: 'message'.
                ^nil]) getBindList at: pName put: 'self ', pName.
            self changed: #makeBind].
    "
    fix codeList to set output variables
    insertion is a little kludgy
    "
    pBlok out
        ifTrue: [
            [lastCode _ codeList last.
            codeList removeLast.
            codeList addLast: (newlastCode _ 'self ', pName, ': self ', pName, '.').
            codeList addLast: lastCode.
            sC _ newlastCode.
            self changed: #makeCode].
    !
```

/usr0/Bluhtkar/Synthesizer.st  last modified Sep 12 10:12 1985   Page 3

```
comments
    out: '', '', Date today printString, '', '', type:', pBlok type, 'view:', pBlok view, 'in:', pBlok in printString,
    out: '', pBlok out printString, '".
    codeString _ pName, comments, '( ', pName, ' isNil ) ifTrue: [ ^ ', pName, ' _ ] ]. ^ ', pName, '.
    (newClass _ Smalltalk at: aClass
                                  ifAbsent:
                                      [self notify: 'message'.
                                       ^nil]) compile: codeString classified: 'parameters'.
    newClass compile: (codeString _ 'set', pName, ': ', 't. comments, ': ', pName, ' _ ', t') classified: 'parameters'.
    codeString _ 'set', pName, ': ', 'Tv[ v _ FillInTheBlank request: ''', pName, ''' value?'' initialAnswer: #nil. self, pName, ': ', v.
    asNumber; changed: #metreValue'.
    newClass compile: codeString classified: 'setValues''
setName: aString
    instrumentName _ aString!

setParameter: aName blok: aB
    "used by block and modifyParameter
    to set parameter blok values
    from globals
    "
    sView isNil ifTrue: [sView _ #linearGraph].
    sType isNil ifTrue: [sType _ #number].
    aB name: aName; type: sType; view: sView.
    aB == 'output'
        ifTrue: [aB in: false; out: true; value: 1,1]
        ifFalse: [aB in: myIn; out: myOut; value: 1,2]!  !

!Generator methodsFor: 'actions'!

inspectMe
    ^self inspect! !

!Generator methodsFor: 'displayParameter'!

addParameter
    | name temp |
    name _ FillInTheBlank request: 'add Parameter named ', initialAnswer: 'dummyPara'.
    self addParameter: ( name asSymbol)!

deleteParameter
    | pName |
    self changeRequest ifFalse: [^self changed: #wakeParameter].
    pName _ sP.
    (self confirm: 'really delete ', pName, ' ?')
        ifFalse: [^self].
    parameterList removeKey: pName ifAbsent: [self notify: 'cant find ', pName].
    self changed: #wakeParameter.
    (Smalltalk at: SelectedSynthesizer ifAbsent: [^nil])
        removeInstVarName: pName printString.
    (Generator at: SelectedSynthesizer ifAbsent: [^nil]) getBindList removeKey: pName ifAbsent: [self notify: 'cant find parameter ', pName ].
    self changed: #wakeBind!
```

```
/usr0/bhaskar/Synthesizer.st last modified Sep 12 10:12 1985    Page 4 getParameters

^parameterList!

inspectParameter
    Generator selectedSynthesizer getSelectedParameter inspect!

newInstance
    "parameter yellow button menu entry point"
    self class newInstance!

parameterList
    ^parameterList keys asSortedCollection!

parameterMenu
    ^ActionMenu
        labels: 'add\delete\new instance\inspect Parameter' withCRs
        lines: #(3 )
        selectors: #(addParameter deleteParameter newInstance inspectParameter
    "
    invoked by synthesis parameter selection in list view
    when parameter selection is changed.
    updates all fields to reflect currently selected parameter
    "
    | pBlok |
    sP _ aSelection.
    sP isNil
        ifFalse: [pBlok _ parameterList at: sP ifAbsent: [self notify: 'bad parameter' , sP printString].
                 self sView: pBlok view.
                 self sType: pBlok type.
```

/usr0/bhaskar/Synthesizer.st last modified Sep 12 10:12 1985    Page 5

```
            self myIn: pBlok in.
            self myOut: pBlok out.

self changed: #wakeType.
            self changed: #wakeView]! !

!Generator methodsFor: 'displayCode'!

addCode
    "
    this should allow the addition of arbitrary strings of code
    from a text view.
    "
    | text |
    text _ FillInTheBlank request: (' add befor ', sC) initialAnswer: #nil.
    self insertCode: text.!

clearCode
    "
    used by code subview of synthesis
    to clear the code list
    "
    self changeRequest ifFalse: [^self changed: #wakeCode].
    (self confirm: 'really clear all?')
        ifFalse: [^self].
    codeList _ OrderedCollection new.
    sC _ nil.
    self changed: #wakeCode!

codeList
    "
    gets code list for synthesis display
    "
    ^codeList!

codeMenu
    "
```

/usr0/bhaskar/Synthesizer.st last modified Sep 12 10:12 1985    Page 6 selectors: #(modifyCode editCode addCode clearCode resetCode deleteCode compileMessage inspectCode )!

compileMessage
    "maps codeList from orderedCollection to string
    and hands off to format/compile
    "
    | target tP cl codeString targetClass trailer tN aCompiler newText |
    target _ Generator SelectedSynthesizer.
    targetClass _ Smalltalk at: instrumentName
        ifAbsent:
            [self notify: 'cant find ', instrumentName, ' to compile'.
            ^nil].
    target isNil
        ifTrue:
            [self notify: 'select a generator'.
            ^self].
    (cl _ codeList) isEmpty ifTrue: [^nil].
    codeString _ String new: 0.
    cl do: [:e | codeString _ codeString , e , ' '].
    "this should really put up a controller
    if a syntax error occurs.
    "
    aCompiler _ Compiler new.
    newText _ aCompiler
                    format: codeString asText
                    in: targetClass
                    notifying: NoController new.
    newText = nil ifFalse: [codeString _ newText asString].
    targetClass compile: codeString classified: 'parameters'!

deleteCode
    "
    "
    | index |
    self changeRequest ifFalse: [^self changed: #wakeCode].
    index _ codeList indexOf: sC.
    (self confirm: 'really delete selected code?', (codeList at: index))
        ifFalse: [^self].
    codeList remove: sC ifAbsent: [self notify: 'cant remove that ', sC, ' ', index printString].
    self changed: #wakeCode!

editCode
    "this should allow the addition of arbitrary strings of code
    from a text view.
    "
    | text |
    self changeRequest ifFalse: [^self changed: #wakeCode].
    codeList indexOf: sC ifAbsent: [].
    text _ FillInTheBlank request: 'edit code' initialAnswer: (codeList at: 1).
    i = 0
        ifTrue: [self addLast: text]
        ifFalse: [ codeList
                at: i /usr0/bhaskar/Synthesizer.st last modified Sep 12 10:12 1985    Page 7

"
used by generate
to insert code as sC in codeList
"
self changeRequest ifFalse: [^self changed: #wakeCode].
sC isNil
    ifTrue: [self addCode: aString]
    ifFalse:
        [codeList add: aString before: sC.
        self changed: #wakeCode]!

inspectCode
    self codeList inspect!

modifyCode
    "
    used from yellow button menu to
    replace operand source value
    in selected codeList statement
    "
    | s i |
    self changeRequest ifFalse: [^self changed: #wakeCode].
    sC isNil
        ifTrue:
            [self notify: 'must select code to be modified!!'.
            ^nil].
    s _ sC copyUpTo: $:.
    s _ s , ': ' , ( ' ' , sB , ' ' ) , '.'.
    (sC indexOf: $.)
        > 0 ifTrue: [s _ s , ' ' , ' '].
    i _ codeList indexOf: sC.
    codeList at: i put: s.
    self changed: #wakeCode!

resetCode
    "
    used by code subview of synthesis
    to set code list to its initial value
    "
    self changeRequest ifFalse: [^self changed: #wakeCode].
    (self confirm: 'really reset?')
        ifFalse: [^self].
    codeList _ Generator initialCodeList: self instrumentName.
    VirtualInstruments resetQuad.
    sC _ codeList last.
    self changed: #wakeCode!

wakeCode: aSelection
    sC _ aSelection! !

!Generator methodsFor: 'synthesis'!

displaySynthesis
    "
    "
    | third half topView twoThirds sg |
    sg _ self.
    third _ 1 / 3.
    twoThirds _ 2 * third.

/usr0/bhaskar/Synthesizer/Synthesizer.st last modified Sep 12 10:12 1985    Page 8

```
                label: 'synthesizing ' , instrumentName
                minimumSize: 300 @ 400.
"
parameter listview
"
topView
        addSubView: (SelectionInListView
                        on: sg
                        printItems: false
                        oneItem: false
                        aspect: #wakeParameter
                        change: #wakeParameter:
                        list: #parameterList
                        menu: #parameterMenu
                        initialSelection: #sP)
                in: (0 @ 0 extent: third @ third)
                borderWidth: 1;

addSubView: (BooleanView
                        on: sg
                        aspect: #myIn
                        label: 'input'
                        change: #myIn:
                        value: true )
                in: (third @ (third * 0.8) extent: (third/2) @ (third * 0.2))
                borderWidth: 1;

addSubView: (BooleanView
                        on: sg
                        aspect: #myOut
                        label: 'output'
                        change: #myOut:
                        value: true)
                in: ((third/2 + third) @ (third * 0.8) extent: (third/2) @ (third * 0.2))
                borderWidth: 1;

addSubView: (SelectionInListView
                        on: Generator
                        printItems: false
                        oneItem: false
                        aspect: #wakeType
                        change: #wakeType:
                        list: #typeList
                        menu: #typeMenu
                        initialSelection: #initType)
                in: (third @ 0 extent: third @ (third * 0.8))
                borderWidth: 1;

addSubView: (SelectionInListView
                        on: Generator
                        printItems: false
                        oneItem: false
                        aspect: #wakeView
                        change: #wakeView:
                        list: #viewList
                        menu: #typeMenu
                        initialSelection: #initView)
                in: (2 * third @ 0 extent: third @ third)
                borderWidth: 1;

addSubView: (SelectionInListView
                        on: sg
                        printItems: true
                        oneItem: false
                        aspect: #wakeCode
```

/usr0/bhaskar/Synthesizer.st last modified Sep 12 10:12 1985    Page 9

```
                        menu: #codeMenu+
                        initialSelection: #sC)
    in: (0 @ third extent: 1 @ third)
    borderWidth: 1;
    addSubView: (SelectionInListView
        on: sp
        printItems: false
        oneItem: false
        aspect: #wakeBind
        change: #wakeBind:
        list: #bindList
        menu: #bindMenu
        initialSelection: #sB)
    in: (0 @ twoThirds extent: 1 @ third)
    borderWidth: 1.
topView controller open!

instrumentName
    ^instrumentName!

myIn    ^myIn!

myIn: aBoolean
    | pB |
    self changeRequest ifFalse: [^self changed: #myIn].
    myIn _ self myIn not.
    self changed: #myIn.
    aBoolean isNil ifTrue: [^nil].
    (pB _ self getSelectedParameter) isNil
        ifTrue: [^nil]
        ifFalse: [pB in: myIn]!

myOut   ^myOut!

myOut: aBoolean
    | pB |
    self changeRequest ifFalse: [^self changed: #myOut].
    myOut _ self myOut not.
    self changed: #myOut.
    aBoolean isNil ifTrue: [^nil].
    (pB _ self getSelectedParameter) isNil
        ifTrue: [^nil]
        ifFalse: [pB out: myOut]!

sB      ^sB!

sC      ^sC!

sP      ^sP!

sType   ^sType!

sType: s
```

/usr0/Bhaskar/Synthus1zur.st last modified Sep 12 10:12 1985    Page 10 sView: s
    sView := s! !

!Generator methodsFor: 'displayBind'!

bindList
    ^ bindList values asSortedCollection!

bindMenu
    ""

^ActionMenu
        labels: 'modify code\delete\clear\inspect' withCRs
        lines: #(1 )
        selectors: #(modifyCode deleteBind clearBindList inspectBindList )!

clearBindList
    bindList := Dictionary new.
    sB := nil.
    self changed: #wakeBind!

deleteBind
    sB isNil
        ifTrue:
            [self notify: 'select a binding'.
            ^nil].
    bindList removeKey: sB ifAbsent: [self notify: 'cant find it'].
    sB := nil!

getBindList
    ^bindList!

inspectBindList
    bindList inspect!

selectedBinding
    ""

sB isNil
        ifTrue:
            [self notify: 'must select a binding first'.
            ^nil].
    ^bindList at: sB!

wakeBind: aSelection
    sB := aSelection! !

"-- -- -- -- -- -- -- -- -- -- -- -- -- -- -- -- -- -- -- -- --"!

Generator class
    instanceVariableNames: ''!

'Generator class comment:
'Generator class messages and variables are used
to keep track of the lists of generators and instruments
'!

class variables

GeneratorList
SelectedGenerator
InstrumentList
SelectedInstrument

/usr1/bhaskar/Synthesizer.st last modified Sep 12 10:12 1985    Page 11

!Generator class methodsFor: 'class initialization'!

addGenerator: aName
"adds the Generator aName into the GeneratorList
must be followed by a call to compileGenerator: newName
"
| newName |
self changeRequest ifFalse: [^self changed: #wakeGenerators].
newName _ aName asSymbol.
(aName at: 1) isLowercase
    ifTrue:
        [self error: 'Instrument Name Must begin with upper case ', aName.
        ^nil].
GeneratorList at: newName put: (Generator new: newName).
self changed: #wakeGenerators!

addGeneratorSpec: aClass parameters: aList
"used by Generator on startup
to add basic generator classes with parameters
to Generator list
"
| aC |
self addGenerator: aClass.
aC _ GeneratorList at: aClass.
aList do: [:para | aC addParameterToList: para].
self compileGenerator: aClass!

compileGenerator: aName
"called by addGenerator
assume generator exists in GeneratorList
and doesnt exist in System Dictionary
"
| generatorBlok newClass |
generatorBlok _ GeneratorList at: aName
    ifAbsent:
        [self notify: 'cant find generator name ', aName.
        ^nil].
"indexOf is too slow
(Smalltalk classNames indexOf: aName asSymbol)
== 0 ifFalse: [(self confirm: ' do you really want to recompile class ',
aName) ifTrue:
[self notify: 'ok'.
^nil]].
"
Transcript cr; show: 'adding generator ', aName.
newClass _ VirtualInstruments
    subclass: aName
    instanceVariableNames: ''
    classVariableNames: ''
    poolDictionaries: ''
    category: 'myInstruments'.
newClass isNil ifTrue: [newClass _ Smalltalk at: aName ifAbsent: [self notify: 'can''t find ', aName]].
newClass zeroKounter.
"create methods for each parameter /usr/0/bhaskar/Synthesizer.st last modified Sep 12 10:12 1985    Page 12

```
GeneratorBlock parameterList do: |:p | GeneratorBlock mkOfParameterMessage: p in: aName|.
(newClass _ Smalltalk at: aName ifAbsent: [self notify: 'can''t find ', aName]) compile: 'runMe  myValue _ 1.0. self change: #
metreValue. ^myValue ' classified: 'parameters'!
initialCodeList: myName
    | iCL date |
    date _ (Date dateAndTimeNow at: 1) printString.
    iCL _ OrderedCollection new.
    iCL addLast: 'runMe'.
    iCL addLast: ' | t |'.
    iCL addLast: ' ', myName , ' ', .
    iCL addLast: ' ", ' date ', " '.
    " it would be nice to install messages to set
      output parameters at this point
      (see code in fix codeParameters) in form
    self oPara: self oPara.

^iCL!

initialize
    "do the following once
     for class initialization
     Generator initialize
    "
    | t |
    t _ Time millisecondsToRun:
        [InstrumentList _ Dictionary new.
         SelectedInstrument _ nil.
         GeneratorList _ Dictionary new.
         SelectedGenerator _ nil.
         TypeList _ #(number voltage frequency range function boolean ).
         ViewList _ #(linearGraph logGraph list linearMeter logMeter ).
         Generator addGeneratorSpec: #Adder parameters: #(left right output ).
         Generator addGeneratorSpec: #Subber parameters: #(left right output ).
         Generator addGeneratorSpec: #Multiplier parameters: #(left right output ).
         Generator addGeneratorSpec: #Divider parameters: #(numerator denominator output ).
         Generator addGeneratorSpec: #LogTenNer parameters: #(input output ).
         Generator addGeneratorSpec: #FunctionGenerator parameters: #(function amplitude frequency ).
         Generator addGeneratorSpec: #DMM parameters: #(function range measuredValue unCertainty )].
    Transcript cr; show: (t / 1000) printString.
    self displayGenerators!

new: aName
    ^super new initialize: aName!

newInstance
    "used by Generator list display yellow button menu
     to create a new instance of the selected Generator.
    "
    SelectedGenerator isNil ifTrue: [self notify: 'must select a Generator' first].
    self addInstrument: SelectedGenerator.
    (Smalltalk at: SelectedGenerator) new display!
```

/usr0/bhankar/Synthesizer.st last modified Sep 12 10:12 1985    Page 13

SelectedSynthesizer
"
Returns the object (not the name) representing
the generator currently being synthesized.
Invoked from VirtualInstruments class in generate message
"
    SelectedSynthesizer isNil
        ifTrue: [self notify: 'please select a generator for synthesis'.
                 ^nil]
        ifFalse: [^GeneratorList at: SelectedSynthesizer]! !

!Generator class methodsFor: 'displayGenerators'!

addGenerator
    | newName |
    self changeRequest ifFalse: [^self error].
    newName _ (FillInTheBlank request: 'add generator named ' initialAnswer: 'NouveauInstrument') asSymbol).
        ifFalse: [^self].
    self addGenerator: newName.
    self compileGenerator: newName! !

codeList
    ^self selectedGenerator codeList!

deleteGenerator
    | s |
    self changeRequest ifFalse: [^self changed: #wakeGenerators].
    s _ SelectedGenerator.
    (self confirm: 'really delete ' , s , '?')
        ifFalse: [^self].
    Transcript cr; show: 'remove ' , s.
    GeneratorList removeKey: s ifAbsent: [self notify: 'cant find ' , s].
    self changed: #wakeGenerators.
    (Smalltalk at: s) removeFromSystem.!

displayGenerators
"

/usr0/Bhaskar/Synthesizer.st last modified Sep 12 10:12 1985    Page 14

Generator displayGenerators

| gl topView | topView _ StandardSystemView
              model: Generator
              label: 'Generator list'
              minimumSize: 150 @ 200.
topView
     addSubView: (SelectionInListView
              on: Generator
              printItems: false
              oneItem: false
              aspect: #wakeGenerators
              change: #wakeGenerators:
              list: #listGenerators
              menu: #generatorMenu
              initialSelection: nil)
     in: (0 @ 0 extent: 1 @ 1)
     borderWidth: 1.
topView controller open!

generatorMenu

^ActionMenu
            labels: 'new instance\synthesize\add\delete\clone\inspect Me' withCRs
            lines: #(2 4)
            selectors: #(addInstrument synthesis addGenerator deleteGenerator cloneGenerator inspectSelectedGenerator )!

inspectSelectedGenerator self selectedGenerator inspect!

listGenerators
    ^GeneratorList keys asSortedCollection!

selectedGenerator
    ^GeneratorList at: SelectedGenerator
        ifAbsent:
            [self notify: 'selected generator ' , SelectedGenerator , ' not found'. GeneratorList inspect.
            ^nil]!

selectedSynthesizer
    ^GeneratorList at: SelectedSynthesizer
        ifAbsent:
            [GeneratorList notify: 'selected Synthesizer ' , SelectedSynthesizer , ' not found'.
            GeneratorList inspect.
            ^nil]!

synthesis
    SelectedGenerator isNil ifTrue: [self notify: 'cant syn sans selection'].
    GeneratorList at: SelectedGenerator ifAbsent: [^self].
    SelectedSynthesizer _ SelectedGenerator.
    (GeneratorList at: SelectedGenerator) displaySynthesis!

wakeGenerators: aString

/usr0/bhaskar/Synthesizer.st last modified Sep 12 '10:12 1985    Page 15 example
    "
    Generator initialize must be done once
    to initialize class variables
    "
    Generator displayGenerators.
    Generator displayInstruments! !

!Generator class methodsFor: 'displayInstruments'!

addInstrument
    "used by display instrument and generator yellow button menus
    to create and add new instrument to instrument list.
    "
    SelectedGenerator isNil
        ifTrue:
            [self notify: 'must select a generator!'.
            GeneratorList inspect].
    Generator addInstrument: SelectedGenerator!

addInstrument: className
    "given a class named className
    creates a new instrument instance newInstance named aName
    and shoves it into class variable instrument list.
    "
    | aName newInstance aClass p |
    self changeRequest ifFalse: [^self changed: #wakeInstruments].
    (className at: 1) isVowel
        ifTrue: [i _ 'an'.]
        ifFalse: [i _ 'a'.].
    aClass _ Smalltalk at: className.
    aName _ i , className , aClass classNounterIncrement printString.
    newInstance _ aClass new: aName parameters: (p _ Generator selectedGenerator getParameters).
    InstrumentList at: aName put: newInstance.
    self changed: #wakeInstruments.
    newInstance display!

deleteInstrument
    | s |
    self changeRequest ifFalse: [^self changed: #wakeInstruments].
    s _ SelectedInstrument.
    (self confirm: 'really delete ' , s , '?')
        ifFalse: [^self].
    InstrumentList removeKey: s ifAbsent: [self notify: 'cant find ' , s].
    self changed: #wakeInstruments!

displayInstruments
    "used to view list of currently available
    instrument names.
    "
    Generator displayInstruments

| topView i1 |
    i1 _ Generator.

```
/usr0/bhaskar/Synthesizur.st  last modified Sep 12 10:12 1985      Page 16 topView
    addSubView: (SelectionInListView
                    on: 1|
                    printItems: false
                    oneItem: false
                    aspect: #makeInstruments
                    change: #makeInstruments:
                    list: #listInstruments
                    menu: #instrumentMenu
                    initialSelection: nil)
                in: (0 @ 0 extent: 1 @ 1)
                borderWidth: 1.
    topView controller open!

generateSelectedInstrument
    | t |
    ( t _ InstrumentList at: SelectedInstrument ifAbsent: [ InstrumentList inspect]) generate.!

inspectInstrument
    ^InstrumentList inspect!

InstrumentList
    ^InstrumentList!

InstrumentMenu
    ^ ActionMenu        labels: 'show me\run me\generate\add\delete\inspect Me\' withCRs
                        lines: #( 3 )
                        selectors: #(showSelectedInstrument runSelectedInstrument generateSelectedInstrument addInstrument delete
                                     Instrument inspectInstrument)!

listInstruments
    ^InstrumentList keys asSortedCollection!

runSelectedInstrument
    ::
    (Generator selectedInstrument) runMe; changed: #metreValue!

selectedInstrument
    ^InstrumentList at: SelectedInstrument
        ifAbsent: [
            [InstrumentList notify: 'selected Instrument ' ,  SelectedInstrument ,  ' not found'. InstrumentList inspect.
            ^nil]]!

showSelectedInstrument
    | t |
    ( t _ InstrumentList at: SelectedInstrument ifAbsent: [ InstrumentList inspect]) display.!

makeInstruments: aSelection
    SelectedInstrument _ aSelection!

!Generator class methodsFor: 'synthesis'!

initCode
    | t |
    ^ t _ (GeneratorList at: SelectedGenerator
        ifAbsent:
            [self notify: 'init'.
```

/usr0/bhaskar/Synthesizer.st last modified Sep 12 10:12 1985    Page 17

```
            ifAbsent:
                    [self notify: 'init'.
                    ^nil]) sType!

initView
    ^ (GeneratorList at: SelectedGenerator
            ifAbsent:
                    [self notify: 'init'.
                    ^nil]) sView!

inspectInstance
    (GeneratorList at: SelectedSynthesizer if  sent:[self notify: 'select']) inspect!

inspectMe
    self inspect!

typeList
    ^TypeList asSortedCollection!

typeMenu
    "
    ^ActionMenu
            labels: 'inspect class\inspect          tance' withCRs
            lines: #( )
            selectors: #(InspectMe inspect:         ance )!

viewList
    ^ViewList asSortedCollection!

wakeType: s
    | pB |
    s isNil ifTrue: [^nil].
    self selectedGenerator sType: s.
    (pB _ self SelectedSynthesizer getSe     dParameter) isNil
            ifTrue: [^nil]
            ifFalse:
                    [pB type: s.
                    self changed: #wakePa     eter]!

wakeView: s
    | pB |
    s isNil ifTrue: [^nil].
    self selectedGenerator sView: s.
    (pB _ self SelectedSynthesizer getSe     tedParameter) isNil
            ifTrue: [^nil]
            ifFalse:
                    [pB view: s.
                    self changed: #wakeP     meter]! !

Generator initialize!
```

/usr/bhaskar/Synthesizer.st last modified Sep 12 10:12 1985    Page 10

```
Number variableSubclass: #ParameterBlok
    instanceVariableNames: 'name type view in out value bind '
    classVariableNames: ''
    poolDictionaries: ''
    category: 'Synthesizer'!

ParameterBlok comment:
'parameter blocks are used by generators
to store the attributes of the parameters.
these include name    of this parameter
in      true if input, else false
out     true if output, else false
value   initial value
type
view
'!

!ParameterBlok methodsFor: 'rekord'!

in
    ^in!

in: i
    ^in _ i!

name
    ^name!

name: n
    ^name _ n asSymbol!

out
    ^out!

out: o
    ^out _ o!

type
    ^type!

type: t
    ^type _ t!

value
    ^value!

value: v
    ^ value _ v!

view
    ^view!

view: v
    ^view _ v! !
```

```
/usr0/bhaskar/Synthesizer.st    last modified Sep 12 10:12 1985    Page 19

!ParameterBlok class methodsFor: 'create'!

new
    | t |
    t _ super new deepCopy.
    ^t! !
```

/usr0/bhaskar/Synthesizer.st last modified Sep 12 10:12 1985    Page 20

```
Number variableSubclass: #VirtualInstruments
    instanceVariableNames: 'myName myParameters selectedP myType myIn myOut myView myValue myKounter myKode '
    classVariableNames: 'ClassParameterList Kounter QuadKounter '
    poolDictionaries: ''
    category: 'Synthesizer'!

VirtualInstruments comment:
'This class provides common display
messages for the instrument classes created
by the Generators'!

!VirtualInstruments methodsFor: 'displayList'!

listMetre: aBlok
    "used by VirtualInstruments display
    for choices
    "
    | newMenu pName wake |
    newMenu _ self listMetreMenu: aBlok.
    pName _ aBlok name asSymbol.
    wake _ (pName , ':') asSymbol.
    ^SelectionInListView
        on: self
        printItems: false
        oneItem: false
        aspect: pName
        change: wake
        list: pName
        menu: newMenu
        initialSelection: nil! !

listMetreMenu: pBlok
    | t ls ll |
    ll _ 'square\sine\triangle' withCRs.
    ls _ #(inspectMe inspectMe ).
    t _ ActionMenu
                    labels: ll
                    lines: #(3 )
                    selectors: ls.
    ^t! !

!VirtualInstruments methodsFor: 'displayMeter'!

display
    "displays an instantiated instruments values
    in meter views
    "
    | xK mySize nP height topView myMetre pView |
    xK _ 0.
    mySize _ 100.
    nP _ myParameters size.
    height _ nP * mySize.
    topView _ StandardSystemView
                model: self
                label: myName
                minimumSize: mySize @ (height * 0.8).
```

```
/usr0/bhaskar/Synthesizer/Synthesizer.st last modified Sep 12 10:12 1985      Page 21 ifTrue: [myMetre _ self listMetre: aP]
                    ifFalse: [myMetre _ self parameterMetre: aP].
            myMetre isNil
                ifTrue: [self notify: 'nil metre']
                ifFalse: [topView
                            addSubview: myMetre
                            in: (0 @ (xK / nP) extent: 1 @ (1 / nP))
                            borderWidth: 1. ].
            xK _ xK + 1].
    topView controller open!

parameterMetre: pBlok
    ""
    | myScale myMetre pName resultName pValue range bottom pUM |
    pName _ pBlok name.
    pValue _ pBlok value.
    range _ 10.0.
    pBlok view == #logMeter | (pBlok view == #logGraph)
        ifTrue:
            [myScale _ LogScale new.
            " LogScale "
            bottom _ 1.0]
        ifFalse:
            [myScale _ LinScale new.
            bottom _ 0.0].
    pBlok view == #linearGraph | (pBlok view == #logGraph)
        ifTrue: [myMetre _ BarGraphView withScale: myScale]
        ifFalse: [myMetre _ PanelMeterView withScale: myScale].
    myMetre itemName: pName; minValue: bottom; maxValue: range.
    myMetre insideColor: Form white.
    myMetre model: self.
    myMetre controller: MeterController new.
    myMetre controller newValueSymbol: #newValue:.
    myMetre updateSymbol: #metreValue.
    myMetre valueAccessSymbol: pName.
    " check for output in pBlock; dont change outputs"
    (pBlok out and: [pBlok in not])
        ifTrue: [resultName _ (pName , ':') asSymbol].
        ifFalse: [resultName _ #fake:]
    myMetre valueChangeSymbol: resultName.
    " build labels & message list on the fly -- do your own setValue" pUM _ ('generate\run\stop\inspect me\set ', pName) withCRs.
    myMetre controller yellowButtonMenu: (PopupMenu labels: pUM)
            yellowButtonMessages: (self makeYBM: pName).
    ^myMetre! !

!VirtualInstruments methodsFor: 'private'!

fake: x
    "
    kludge used by instrument display
    to prevent output meteres
    from being changed from front panel
    "
    self notify: 'fake'!

Generate
    "
    should send Smalltalk code to
    SelectedGenerator underSynthesis
```

/usr0/bhaskar/Synthusizur/Synthusizer.st last modified Sep 12 10:12 1985    Page 22

```
| target pName pVal s tP tt quad quadList index |
target _ Generator SelectedSynthesizer.
target isNil
    ifTrue:
        [self notify: 'select a generator'.
        ^self].
"
emit small talk code into an ordered list
"
target insertCode: ' t _ (Generator InstrumentList) at: ' , myName printString , '.'.
myParameters do: [:aP | aP in
    ifTrue:
        [pName _ aP name printString.
        "take value from instance!!"
        pVal _ (self perform: pName asSymbol) printString.
        s _ 't ' , pName , ': ' , pVal , '.'.
        target insertCode: s]].
"
set up unique quad names here.
declaring temps after fact is a pain
"
quad _ VirtualInstruments nextQuad.
target insertCode: quad , ' _ t runMe.'.
target getBindList at: quad put: quad.
quadList _ target codeList at: 2.
quadList isNil
    ifTrue:
        [self notify: 'empty quad list'.
        ^nil].
index _ quadList indexOf: $|.
quadList _ quadList
    copyReplaceFrom: index + 1
    to: index + 1
    with: ' ' , quad , ' '.
target codeList at: 2 put: quadList.
target changed: #makeCode.
"
add my parameters to the bind list
"
myParameters do: [:aP | (tt _ aP out)
    ifTrue:
        [pName _ aP name printString.
        target getBindList at: myName , pName put: '((Generator InstrumentList) at: ' , myName , ') ' , pName]]

target changed: #makeBind!

initialize: aName

| temp |
    myName _ aName.
    quadKounter _ 0!

inspectMe
    self inspect!

makeVBM: pName
```

/usr/U/Dhaskar/Synthesizer.st last modified Sep 12 10:12 1985    Page 23

```
myParameters: aDB
    myParameters _ aDB!

myValue
    myValue isNil ifTrue: [myValue _ 1].
    ^myValue!

myValue: aValue
    "default class instance message to set
     computed instrument value"
    ^myValue _ aValue!

run
    "used by an instruments yellow button menu
     to update result"
    | t |
    t _ self runMe.
    self changed: #metreValue.!

setValue
    "value should come from parameter via ??? value, not instrument
     and go back to instrument via ??? value: value"
    | value |
    value _ FillInTheBlank request: 'new value ' initialAnswer: myValue printString.
    myValue _ value asNumber.
    self changed: #wakeMetre.
    self notify: 'new value ', value printString!

stopMe
    "stops my dependents"
    self dependents notify: 'stopMe'.
    self changed! !

" -- -- -- -- -- -- -- -- -- -- -- -- -- -- -- "

VirtualInstruments class
    instanceVariableNames: ''!

!VirtualInstruments class methodsFor: 'initialize'!

new: aName parameters: parameterBlok
    "used by Generator instantiate messages
     to create a new instance of an instrument
     and initialize it with a name and parameter block"
    | instance |
```

/usr/0/bhaskar/Synthesizer.st last modified Sep 12 10:12 1985    Page 24

!VirtualInstruments class methodsFor: 'action'!

classKounterIncrement
    ^Kounter _ Kounter + 1!

nextQuad
    QuadKounter isNil ifTrue: [QuadKounter _ 0].
    ^ 'q', (QuadKounter _ QuadKounter + 1) printString!

resetQuad
    ^ QuadKounter _ 0!

zeroKounter
    Kounter _ 0! !

APPENDIX III

/usr0/bhaskar/Interface-Meters.st last modified Sep 12 10:17 1985    Page 1

```
MouseMenuController subclass: #MeterController
    instanceVariableNames: 'newValueSymbol '
    classVariableNames: ''
    poolDictionaries: ''
    category: 'Interface-Meters'!

!MeterController methodsFor: 'control activity'!

controlActivity
    "tell view when user has a new value by pressing and releasing red button"

| currentMousePoint saveMousePoint |
    saveMousePoint _ nil.
    [ sensor redButtonPressed & self viewHasCursor ] whileTrue:
        [ currentMousePoint _ sensor mousePoint.
        (( saveMousePoint = currentMousePoint ) not ) ifTrue:
            [ saveMousePoint _ currentMousePoint.
            view perform: newValueSymbol with: currentMousePoint ]].
    super controlActivity!

isControlActive
    ^super isControlActive & sensor blueButtonPressed not! !

!MeterController methodsFor: 'view interface'!

newValueSymbol
    "tells what symbol will be used send view with new value"

^newValueSymbol!

newValueSymbol: aSymbol
    "tells what symbol will be used send view with new value"

newValueSymbol _ aSymbol.
    ^self! !

!MeterController methodsFor: 'menu messages'!

menuMessageReceiver
    "Answer the object that should be sent a message when a menu item is selected."
    ^ self model! !

!MeterController methodsFor: 'menu setup'!

redButtonMenu: aSystemMenu redButtonMessages: anArray
    ^self error: 'MeterController does not support red button menus'! !
```

```
/usr0/bhaskar/Interface-Meters.st last modified Sep 12 10:17 1985   Page 2

Object subclass: #MeterScale
    instanceVariableNames: 'maxScale maxValue minScale minValue '
    classVariableNames: ''
    poolDictionaries: ''
    category: 'Interface-Meters'!

!MeterScale methodsFor: 'conversion'!

scaleToValue: aScale
    ^self subclassResponsibility!

valueToScale: aValue
    ^self subclassResponsibility! !

!MeterScale methodsFor: 'private'!

resetConstant
    ^self subclassResponsibility! !

!MeterScale methodsFor: 'limits'!

maxScale
    ^maxScale!

maxScale: aNumber
    maxScale _ aNumber.
    self resetConstant.
    ^self!

maxValue
    ^maxValue!

maxValue: aNumber
    maxValue _ aNumber.
    self resetConstant.
    ^self!

minScale
    ^minScale!

minScale: aNumber
    minScale _ aNumber.
    self resetConstant.
    ^self!

minValue
    ^minValue!

minValue: aNumber
    minValue _ aNumber.
    self resetConstant.
    ^self! !
```

```
/usr0/bhaskar/Interface-Meters.st last modified Sep 12 10:17 1985    Page 3

MeterScale subclass: #LinScale
    instanceVariableNames: 'conversionConstant '
    classVariableNames: ''
    poolDictionaries: ''
    category: 'Interface-Meters'!

!LinScale methodsFor: 'conversion'!

scaleToValue: aScale
    ^minValue + ((aScale - minScale) / self conversionConstant)!

valueToScale: aValue
    aValue = nil ifTrue: [ ^minScale ]
               ifFalse: [ ^minScale + ((aValue - minValue) * self conversionConstant)]! !

!LinScale methodsFor: 'private'!

conversionConstant
    (conversionConstant = nil)
        ifTrue: [ ^conversionConstant ← ( maxScale - minScale ) / ( maxValue - minValue ) ]
        ifFalse: [ ^conversionConstant ]!

resetConstant
    conversionConstant ← nil.
    ^self! !
```

/usr0/bhaskar/Interface-Meters.st last modified Sep 12 10:17 1985    Page 4

```
MeterScale subclass: #LogScale
    instanceVariableNames: 'conversionConstant lnMinValue '
    classVariableNames: ''
    poolDictionaries: ''
    category: 'Interface-Meters'!

!LogScale methodsFor: 'private'!

conversionConstant
    (conversionConstant = nil)
        ifTrue: [ ^conversionConstant _ ( maxScale - minScale ) / (( maxValue / minValue ) ln ) ]
        ifFalse: [ ^conversionConstant ]!

resetConstant
    conversionConstant _ nil.
    ^self! !

!LogScale methodsFor: 'limits'!

maxValue: aNumber
    aNumber > 0
        ifTrue:
            [maxValue _ aNumber.
            self resetConstant.
            ^self]
        ifFalse: [^self error: 'LogScale can''t handle negative numbers']!

minValue: aNumber
    aNumber > 0
        ifTrue:
            [lnMinValue _ (minValue _ aNumber) ln.
            self resetConstant.
            ^self]
        ifFalse: [^self error: 'LogScale can''t handle negative numbers']! !

!LogScale methodsFor: 'conversion'!

scaleToValue: aScale
    ^(lnMinValue + ((aScale - minScale) / self conversionConstant)) exp!

valueToScale: aValue
    avalue = nil
        ifTrue: [^minScale]
        ifFalse: [aValue > 0
            ifTrue: [^ minScale + (avalue ln - lnMinValue * self conversionConstant)]
            ifFalse: [ ^ minScale]]! !
```

/usr0/bhaskar/Interface-Meters.st  last modified Sep 12 10:17 1985    Page 5

```
View subclass: #MeterView
    instanceVariableNames: 'cachedBox cachedForm center currentValue itemName minValue maxValue myProject myScale pen radius updateOn valueAccess '
    classVariableNames: ''
    poolDictionaries: ''
    category: 'Interface-Meters'!

!MeterView methodsFor: 'initialize-release'!

initialize
    super initialize.
    myProject _ Project current.
    pen _ Pen new.
    ^self forceFullDisplayNextTime!

itemName: aString
    itemName _ aString asText.
    itemName emphasizeFrom: 1 to: itemName size with: 9.
    itemName asDisplayText.
    ^self forceFullDisplayNextTime!

maxValue
    ^maxValue!

maxValue: aNumber
    myScale maxValue: ( maxValue _ aNumber ).
    ^self forceFullDisplayNextTime!

minValue
    ^minValue!

minValue: aNumber
    myScale minValue: ( minValue _ aNumber ).
    ^self forceFullDisplayNextTime!

scale
    ^myScale!

scale: aScale
    myScale _ aScale.
    ^self! !

!MeterView methodsFor: 'displaying'!

display
    myProject == Project current
        ifTrue: [super display]! !

!MeterView methodsFor: 'private'!

forceFullDisplayNextTime
    "forces next display of the view to be full redisplay (cached image not used)"
    cachedBox _ nil.
    ^self! !

!MeterView methodsFor: 'model access'!

valueAccess: aSymbol
    "this sets the value of valueAccess to be the message sent to the model to get the value of current value"
    valueAccess _ aSymbol.
```

```
/usr0/bhaskar/Interface-Meters.st last modified Sep 12 10:17 1985    Page 6 valueChange
    "tell model that I have a new value, then update self , but acess the new currentValue from the model"

model perform: valueChange with: currentValue.
    self update: 'updateOn!

valueChangeSymbol: aSymbol
    "this sets the value of valueChange to be the message sent to the model to get the value of current value"

valueChange _ aSymbol.
    ^self!!

!MeterView methodsFor: 'updating'!

update: selfOrSymbol
    "this is used to force an update by sending appropriate values in selfOrSymbol"

( selfOrSymbol == self ) ifTrue: [ self display ].
    ( selfOrSymbol == updateOn ) ifTrue: [ self valueFromModel display ]!

updateOn: aSymbol
    "this sets the symbol, which, if broadcast, will cause me to redisplay myself"

updateOn _ aSymbol.
    ^self!

valueFromModel
    "this is used to get a value from the model"

currentValue _ model perform: valueAccess.
    currentValue > self maxValue ifTrue: [currentValue > 0
            ifTrue: [self maxValue: (10 raisedTo: (currentValue * 1.2 log: 10) ceiling)]
            ifFalse:[self maxValue: (10 raisedTo: (currentValue negated * 0.8 log: 10) floor) negated]].
    currentValue < self minValue ifTrue: [currentValue > 0
            ifTrue: [self minValue: (10 raisedTo: (currentValue * 0.8 log: 10) floor)]
            ifFalse:[self minValue: (10 raisedTo: (currentValue negated * 1.2 log: 10) ceiling) negated]]! !

"-- -- -- -- -- -- -- -- -- -- -- -- -- -- -- -- -- -- "!

MeterView class
    instanceVariableNames: ''!

!MeterView class methodsFor: 'instance creation'!

withScale: aScale
    | aMeter |
    aMeter _ self new scale: aScale.
    aMeter initScale.
    ^aMeter!!
```

/usr0/bhaskar/Interface-Meters.st last modified Sep 12 10:17 1985    Page 7

```
MeterView subclass: #BarGraphView
    instanceVariableNames: 'barOrigin barY '
    classVariableNames: ''
    poolDictionaries: ''
    category: 'Interface-Meters'!

!BarGraphView methodsFor: 'displaying'!

displayView
    "how to draw a picture of me"

| selfInsetDisplayBox extent itemNamePosition temp minValuePosition maxValuePosition currentValuePosition |
    selfInsetDisplayBox _ self insetDisplayBox.
    currentValue = nil ifTrue: [self valueFromModel].
    self topView isCollapsed
        ifFalse:
            [(cachedBox == nil or: [cachedBox ~= selfInsetDisplayBox])
                ifTrue:
                    [extent _ selfInsetDisplayBox extent.
                    barOrigin _ selfInsetDisplayBox origin + selfInsetDisplayBox leftCenter / 2.
                    barY _ selfInsetDisplayBox extent y / 2.
                    myScale _ maxScale: extent x.
                    itemNamePosition _ selfInsetDisplayBox corner.
                    itemName
                        displayOn: Display
                        at: selfInsetDisplayBox topLeft
                        clippingBox: selfInsetDisplayBox.
                    temp _ minValue printString asDisplayText.
                    minValuePosition _ selfInsetDisplayBox bottomLeft - (0 @ temp boundingBox height).
                    temp
                        displayOn: Display
                        at: minValuePosition
                        clippingBox: selfInsetDisplayBox.
                    temp _ maxValue printString asDisplayText.
                    maxValuePosition _ selfInsetDisplayBox corner - temp boundingBox extent.
                    temp
                        displayOn: Display
                        at: maxValuePosition
                        clippingBox: selfInsetDisplayBox.
                    cachedForm _ Form fromDisplay: (cachedBox _ selfInsetDisplayBox topLeft)]
                ifFalse: [cachedForm displayAt: selfInsetDisplayBox topLeft].
        Display
            fill: (Rectangle origin: barOrigin extent: (myScale valueToScale: currentValue) rounded @ barY)
            rule: Form under
            mask: Form veryLightGray).
        temp _ currentValue printString asText.
        temp
            emphasizeFrom: 1
            to: temp size
            with: 17.
        temp _ temp asDisplayText.
        currentValuePosition _ selfInsetDisplayBox center - (0.5 * temp boundingBox extent).
        temp
            displayOn: Display
            at: currentValuePosition
            clippingBox: selfInsetDisplayBox]! !

!BarGraphView methodsFor: 'controller interface'!
```

/usr0/bhaskar/Interface-Meters.st last modified Sep 12 10:17 1985    Page 8 currentValue ← myScale scaleToValue: aPoint x - self insetDisplayBox left.
self valueChange! !

!BarGraphView methodsFor: 'initialize-release'!

initScale
    myScale minScale: 0.
    ^self! !

/usr0/bhaskar/Interface-Meters.st last modified Sep 12 10:17 1985   Page 9

```
MeterView subclass: #PanelMeterView
    instanceVariableNames: ''
    classVariableNames: ''
    poolDictionaries: ''
    category: 'Interface-Meters'!

!PanelMeterView methodsFor: 'initialize-release'!

initScale
    myScale minScale: -90; maxScale: 90.
    ^self! !

!PanelMeterView methodsFor: 'displaying'!

displayView
    "how to draw a picture of me"
    | extent circle selfInsetDisplayBox temp minValuePosition maxValuePosition currentValuePosition itemNamePosition |
    selfInsetDisplayBox _ self insetDisplayBox.
    currentValue = nil ifTrue: [self valueFromModel].
    self topView isCollapsed
        ifFalse:
            [(cachedBox == nil or: [cachedBox ~= selfInsetDisplayBox])
                ifTrue:
                    [extent _ selfInsetDisplayBox extent.
                    center _ selfInsetDisplayBox bottomCenter + selfInsetDisplayBox center / 2.
                    radius _ selfInsetDisplayBox width / 2 * 0.9.
                    (Arc new)
                        center: 0 @ 0
                        radius: radius
                        quadrant: 1;
                        displayOn: Display
                        at: center
                        clippingBox: selfInsetDisplayBox; quadrant: 2;
                        displayOn: Display
                        at: center
                        clippingBox: selfInsetDisplayBox.
                    itemNamePosition _ selfInsetDisplayBox corner.
                    itemName
                        displayOn: Display
                        at: selfInsetDisplayBox topLeft
                        clippingBox: selfInsetDisplayBox.
                    pen defaultNib: 1; north; turn: -90.
                    11 timesRepeat: [pen place: center; up; go: radius * 0.9; down; go: radius * 0.11; turn: 18].
                    temp minValue printString asDisplayText.
                    minValuePosition _ selfInsetDisplayBox bottomLeft - (0 @ temp boundingBox height).
                    temp
                        displayOn: Display
                        at: minValuePosition
                        clippingBox: selfInsetDisplayBox.
                    temp maxValue printString asDisplayText.
                    maxValuePosition _ selfInsetDisplayBox corner - temp boundingBox extent.
                    temp
                        displayOn: Display
                        at: maxValuePosition
                        clippingBox: selfInsetDisplayBox.
                    cachedForm _ Form fromDisplay: (cachedBox _ selfInsetDisplayBox)]
                ifFalse: [cachedForm displayAt: selfInsetDisplayBox topLeft].
            pen defaultNib: 2; place: center; north; turn: (myScale valueToScale: currentValue); down; go: radius.
            temp _ currentValue printString asText.
```

```
/usr0/bhaskar/Interface-Meters.st last modified Sep 12 10:17 1985    Page 10 with: 17.
        temp _ temp asDisplayText.
        currentValuePosition _ self insetDisplayBox center - (0.5 * temp boundingBox extent).
        temp
            displayOn: Display
            at: currentValuePosition
            clippingBox: self insetDisplayBox]! !

!PanelMeterView methodsFor: 'controller interface'!

newValue: aPoint
    "sent to me by MeterController to tell me that the user has pressed
    red button on a point"

| angle |
    aPoint y > center y
        ifTrue: [ angle _ 90]
        ifFalse:
            [aPoint x - center x = 0
                ifTrue: [ angle _ -90]
                ifFalse:
                    [angle _ (center y - aPoint y / (aPoint x - center x)) arcTan radiansToDegrees.
                     angle <-0 ifTrue: [angle _ 180 + angle]].
    currentValue _ myScale scaleToValue: ( 90 - angle ).
    self valueChange]! !
```

We claim:

1. An instrumentation system comprising:

a computer;

a plurality of instruments selectively controlled by input data and producing output data;

bus means connecting said instruments to said computer for conveying input data and output data to and from selected instruments;

a screen controlled by said computer; and software controlling operation of said computer implementing a plurality of virtual machines each comprising a set of computer instructions, said virtual machines being associated with respective ones of said instruments for providing input thereto or receiving output therefrom, a virtual machine controlling display on said screen of a virtual front panel depicting an instrument and able to display a representation of data associated with an instrument represented by a virtual front panel;

said software further comprising:

software responsive to operator input for enabling a selection of ones of said virtual front panels, said computer being responsive to said selection for generating a new virtual machine comprising a combined set of the computer instructions which comprises the virtual machines associated with the selection of ones of said virtual front panels, said new virtual machine controlling display of a new virtual front panel on said screen including representation of values conveyed on said bus with respect to instruments represented by said selection of ones of said virtual front panels, said new virtual machine initiating transmission of input data to one of said instruments in response to changes in values of input data represented by said new virtual front panel and for portraying an output data value as represented by the new virtual front panel in response to output data received from another one of said instruments.

2. An instrumentation system for carrying out a procedure with respect to equipment being tested by the instrumentation system, comprising:

a computer;

bus means coupled to said computer wherein said bus means carries data to and from said computer;

instrumentation also coupled to said bus means, at least a portion of said instrumentation receiving data from said computer via said bus means and at least a portion of said instrumentation supplying data to said computer via said bus means;

means for coupling at least a portion of said instrumentation to equipment under test; and a screen controlled by said computer;

wherein said computer is controlled by software for displaying on said screen at least one virtual front panel representing at least a said portion of said instrumentation, wherein said software implements a first virtual machine comprising a first set of computer instructions corresponding to a said at least one virtual front panel for controlling coupling of data with a said portion of said instrumentation;

wherein said software provides at least one second virtual machine comprising a second set of computer instructions for bringing about performance of a computer operation as well as display on said screen of another virtual front panel representing a said computer operation; and wherein said software is operable in response to operator designation of virtual machines by selection of front panels to generate a combined instruction set from said first and second instruction sets which provides a further front panel, said combined instruction set conjointly controlling said instrumentation for carrying out said procedure.

3. An instrumentation system comprising:

a computer;

an instrument;

bus means connecting the instrument to the computer to provide data interchange therebetween;

a screen controlled by said computer;

means conveying user input including input commands to said computer; and memory means storing software in execution by said computer implementing a collection of virtual machines, each virtual machine of said collection of virtual machines comprising a set of instructions, said collection of virtual machines including:

a first virtual machine responsive to data on said bus means and displaying on said screen a first virtual front panel representing said instrument; and a plurality of second virtual machines, each producing designated operation output data in response to operation input data, and displaying a separate second virtual front panel on said screen, wherein said first and second virtual machines respond to input commands by generating output computer instructions corresponding to the sets of instructions of said first and second virtual machine;

said software further implementing software generation responding to user input selecting ones of said virtual machines by combining the output computer instructions generated by said first and second virtual machines in response to input commands to form new software implementing a third virtual machine performing operations corresponding to the operations of selected first and second virtual machines.

4. The system in accordance with claim 3 wherein at least one of said first, second and third virtual front panels displays an input data value and wherein a virtual machine controlling said at least one virtual front panel comprises means for providing input to said software for adjusting said input data value in response to user input.

5. For an instrumentation system comprising a computer, an instrument, bus means connecting the instrument to the computer, a screen controlled by said computer, and means conveying user input including input commands to said computer, a method for controlling said instrument and displaying values relating thereto, the method comprising the steps of:

executing software implementing a first virtual machine comprising a first set of computer instructions corresponding to said instrument and displaying on said screen a first virtual front panel representing said instrument, and implementing a plurality of second virtual machines comprising second sets of computer instructions, each for producing operation output data in response to operation input data and displaying a second virtual front panel on said screen representing an operation controlled by the second virtual machine, wherein said first and second virtual machines respond to input commands for selecting said first and second virtual machines by generating output computer instructions representative of the respective instruction sets of the selected first and second virtual machines;

transmitting said input commands to said software pertaining to ones of said first and second virtual machines selected in response to user input;

combining output computer instructions generated by said ones of said first and second virtual machines in response to said input commands to form new software implementing a third virtual machine executing a sequence of operations synthesizing the operations of said first and second virtual machines selected in response to user input and displaying on said screen a third virtual front panel representing said third virtual machine, wherein said user input further defines the sources and destinations of input and output data for said first and second virtual machines as synthesized by said third virtual machine; and executing said new software implementing said third virtual machine.

6. The method in accordance with claim 5 wherein said third virtual front panel displays at least one value of instrument output data and wherein the step of executing said new software comprises the step of adjustment of said instrument in response to user input.

7. An instrumentation system for conducting a procedure with respect to a device under test, comprising:

a computer;

a plurality of instruments adapted for coupling to said device under test; and bus means connecting said instruments to said computer for providing data communication between said instruments and said computer;

said computer being controlled by software implementing a plurality of selectable virtual machines, said virtual machines being associated with said plurality of instruments, a said virtual machine comprising a set of instructions controlling a corresponding instrument and display on said screen of a corresponding virtual front panel;

said software further comprising:

software responsive to operator input for enabling selection of ones of said virtual front panels;

said computer being responsive to said selection for generating a new virtual machine, said new virtual machine controlling display of a new virtual front panel on said screen;

said new virtual machine initiating data transmission with ones of said instruments in response to operator interaction with said new virtual front panel.

8. An instrumentation system comprising:

computer means;

instrumentation which operates according to input data for producing output data;

bus means connecting the instrumentation to the computer means for carrying said input data from said computer means to said instrumentation and for carrying said output data from said instrumentation to said computer means; and a screen controlled by said computer means;

wherein said computer means is controlled by software for displaying on said screen at least a first virtual front panel graphically depicting said instrumentation;

wherein said computer software implements a first virtual machine comprising a first set of computer instructions for controlling the receipt by said computer means via said bus means of said output data from said instrumentation and a second virtual machine comprising a second set of computer instructions for bringing about a computer operation;

said computer software controlling display on said screen of a second virtual front panel associated with said second virtual machine;

wherein said computer software implements operator controlled selection of ones of said first and second virtual machines to carry out a programmed process involving said instrumentation; and wherein said computer software further implements synthesizing a new virtual machine wherein said new virtual machine is defined by the selected virtual machine and operator selected interrelationship between said selected virtual machines.

* * * * *